(12) United States Patent
Echizenya

(10) Patent No.: US 12,030,620 B2
(45) Date of Patent: Jul. 9, 2024

(54) LANDING GEAR FOR FLIGHT VEHICLE

(71) Applicant: HONDA MOTOR CO., LTD., Tokyo (JP)

(72) Inventor: Takeshi Echizenya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/117,494

(22) Filed: Mar. 6, 2023

(65) Prior Publication Data
US 2023/0312086 A1 Oct. 5, 2023

(30) Foreign Application Priority Data
Mar. 30, 2022 (JP) ................................. 2022-056780

(51) Int. Cl.
*B64C 25/20* (2006.01)
*B64C 25/32* (2006.01)

(52) U.S. Cl.
CPC .............. *B64C 25/32* (2013.01); *B64C 25/20* (2013.01)

(58) Field of Classification Search
CPC .......... B64C 25/20; B64C 25/32; B64C 25/12
See application file for complete search history.

(56) References Cited

U.S. PATENT DOCUMENTS

| 2,323,385 A | * | 7/1943 | Eddy | B64C 25/12 |
| | | | | 244/102 R |
| 2017/0253324 A1 | * | 9/2017 | Zhao | B64C 25/12 |
| 2018/0370618 A1 | * | 12/2018 | Harris | B64C 39/024 |

FOREIGN PATENT DOCUMENTS

| CN | 107985564 A | * | 5/2018 | ............. B64C 25/12 |
| CN | 108284946 A | * | 7/2018 | |
| CN | 108513558 A | * | 9/2018 | ............... B64C 1/30 |
| CN | 112319783 A | * | 2/2021 | |
| JP | 6792385 | | 11/2020 | |

* cited by examiner

*Primary Examiner* — Tye William Abell
(74) *Attorney, Agent, or Firm* — Amin, Turocy & Watson, LLP

(57) ABSTRACT

A landing gear for a flight vehicle is used during landing. The landing gear for a flight vehicle includes a first cylinder structure configured to have an upper end which is coupled to be able to roll with respect to the flight vehicle; and a second cylinder structure configured to have a lower end which is able to come into contact with the ground, configured to be able to relatively move in an axial direction along a reference axis with respect to the first cylinder structure, and configured to be able to relatively rotate about the reference axis with respect to the first cylinder structure. The first cylinder structure and the second cylinder structure switch the landing gear between a stowed state and a released state by means of the relative movement and the relative rotation.

14 Claims, 19 Drawing Sheets

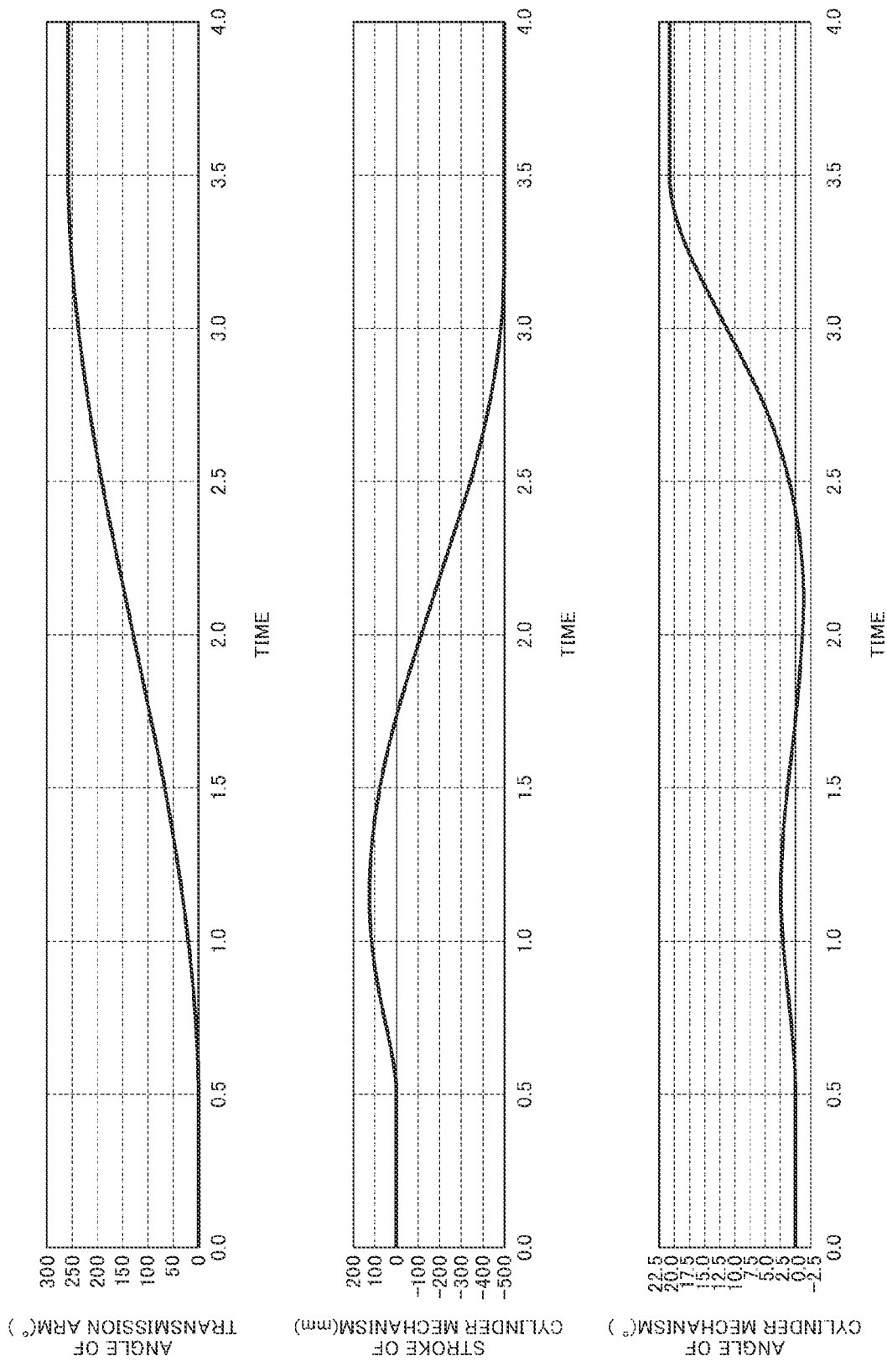

LANDING GEAR FOR FLIGHT VEHICLE

CROSS-REFERENCE TO RELATED APPLICATION

Priority is claimed on Japanese Patent Application No. 2022-056780, filed Mar. 30, 2022, the content of which is incorporated herein by reference.

BACKGROUND OF THE INVENTION

Field of the Invention

The present invention relates to a landing gear for a flight vehicle.

Description of Related Art

In the related art, a landing gear for a flight vehicle used during landing is known. For example, Japanese Patent No. 6792385 discloses a landing gear for a flight vehicle having a structure that allows landing regardless of a state of a landing site. This landing gear for a flight vehicle includes a honeycombed core portion having cell walls and a plurality of cell holes surrounded by the cell walls in a lower portion of the flight vehicle. The core portion has shock absorption hole portions having a larger diameter than the cell holes and extending in the same direction as the cell holes. Due to the honeycombed core portion having the shock absorption hole portions, collision energy can be absorbed during landing of the flight vehicle.

SUMMARY OF THE INVENTION

However, since the core portion has a honeycombed shape, the landing gear may be deformed every time the flight vehicle lands. For this reason, there is a need to produce and replace a landing gear every time the flight vehicle flies, and thus the running cost for flying the flight vehicle increases. Moreover, since there is also a need to discard a used landing gear, the cost for considering an influence of discard on the environment is also incurred. For this reason, there is a demand for reusable landing gears for a flight vehicle.

Aspects according to the present invention have been made in consideration of the foregoing points, and an object thereof is to provide a reusable landing gear for a flight vehicle.

In order to resolve the foregoing problems and achieve the object, the present invention employs the following aspects.

(1) A landing gear for a flight vehicle according to an aspect of the present invention is used during landing. The landing gear for a flight vehicle includes a first cylinder structure configured to have an upper end which is coupled to be able to roll with respect to the flight vehicle; and a second cylinder structure configured to have a lower end which is able to come into contact with the ground, configured to be able to relatively move in an axial direction along a reference axis with respect to the first cylinder structure, and configured to be able to relatively rotate about the reference axis with respect to the first cylinder structure. The first cylinder structure and the second cylinder structure switch the landing gear between a stowed state and a released state by means of the relative movement and the relative rotation.

(2) In the aspect of the foregoing (1), the first cylinder structure may include an upper cylinder having an upper end which is coupled to be able to roll with respect to the flight vehicle, and a rotation mechanism provided in the upper cylinder and able to rotate about the reference axis. The second cylinder structure may include a lower cylinder having a lower end which is able to come into contact with the ground and able to move in the axial direction with respect to the upper cylinder, and a guide structure provided in the lower cylinder and guiding rotation of the rotation mechanism about the reference axis and movement in the axial direction.

(3) In the aspect of the foregoing (2), the rotation mechanism may alternately establish the stowed state and the released state of the landing gear by alternately repeating the rotation and the movement with respect to the guide structure in accordance with movement of the lower cylinder in the axial direction.

(4) In the aspect of the foregoing (2) or (3), the lower cylinder may include a lower cylinder body having a cylindrical shape along the reference axis, and seat surface portions provided at an upper end of the lower cylinder body. The rotation mechanism may include a rotation cylinder body having a cylindrical shape along the reference axis, and abutting portions provided at a lower end of the rotation cylinder body and abutting the seat surface portions in the released state.

(5) In the aspect of the foregoing (4), the abutting portions may cancel abutment with respect to the seat surface portions by means of the rotation of the rotation mechanism.

(6) In the aspect of the foregoing (4) or (5), regarding the seat surface portions, a plurality of seat surface portions may protrude from an inner circumference of the upper end of the lower cylinder body to an inward side of the lower cylinder body in a radial direction and be provided with a gap therebetween in a circumference direction of the lower cylinder body. Regarding the abutting portions, a plurality of abutting portions may protrude from an outer circumference of the lower end of the rotation cylinder body to an outward side of the rotation cylinder body in the radial direction and be provided with a gap therebetween in the circumference direction of the rotation cylinder body.

(7) In the aspect of the foregoing (6), regarding the seat surface portions, three seat surface portions may be provided and have a rotationally symmetrical shape of three-fold symmetry with respect to a center of the lower cylinder body when viewed in the axial direction. Regarding the abutting portions, three abutting portions may be provided and have a rotationally symmetrical shape of three-fold symmetry with respect to a center of the rotation cylinder body when viewed in the axial direction.

(8) In any one aspect of the foregoing (4) to (7), the lower cylinder body may include sliding grooves allowing the abutting portions to slide therein. The sliding grooves may extend parallel to the axial direction from the upper end to the lower end of the lower cylinder body in the inner circumference of the lower cylinder body.

(9) In any one aspect of the foregoing (2) to (8), the lower cylinder may include a lower cylinder body having a cylindrical shape along the reference axis, and seat surface portions provided at an upper end of the lower cylinder body. The guide structure may include a guide cylinder body provided on the upper end side of the upper cylinder from the seat surface portions in the axial direction and having a cylindrical shape along the reference axis, and a plurality of groove structures regularly provided in the circumference direction in an inner circumference of the guide cylinder body. The rotation mechanism may include a rotation cylinder body having a cylindrical shape along the reference axis, and a plurality of projection structures regularly provided in the circumference direction in an outer circumference of the rotation cylinder body.

(10) In the aspect of the foregoing (9), the groove structures each may include a first groove extending parallel to the axial direction from the upper end to the lower end of the guide cylinder body; a second groove extending obliquely with respect to the axial direction from a middle part of the first groove toward the upper end of the guide cylinder body and opening at the upper end of the guide cylinder body; and a third groove provided on the lower end side of the guide cylinder body from the second groove, extending obliquely with respect to the axial direction from a middle part of the first groove toward the lower end of the guide cylinder body, and opening at the lower end of the guide cylinder body. The projection structure may include extending portions extending parallel to the axial direction from the upper end to the lower end of the rotation cylinder body; and first projecting portions and second projecting portions protruding from the extending portions to the outward side of the rotation cylinder body in the radial direction and provided with a gap therebetween in the circumference direction and the axial direction of the rotation cylinder body in a manner of being able to slide in any of the first groove, the second groove, and the third groove.

(11) In any one aspect of the foregoing (2) to (10), a shock absorber may be stowed inside the upper cylinder. The shock absorber may include a rod extending in the axial direction and able to rotate about the reference axis. The rotation mechanism may be attached to a tip of the rod.

(12) In any one aspect of the foregoing (2) to (11), the landing gear for a flight vehicle may further include lower beams configured to each have a first end which is coupled to be able to roll with respect to the flight vehicle and have a second end which is coupled to be able to roll with respect to the lower cylinder.

(13) In the aspect of the foregoing (12), regarding the lower beams, a pair of lower beams may be provided such that the first ends are coupled to two spots in the flight vehicle. An actuator for driving the landing gear and a transmission arm for transmitting a driving force of the actuator to the lower cylinder may be provided between the pair of lower beams.

(14) In the aspect of the foregoing (13), the actuator may be surrounded by the flight vehicle, the lower cylinder, and the pair of lower beams in the stowed state.

(15) In any one aspect of the foregoing (12) to (14), when the landing gear is shifted from the released state to the stowed state, operation may be performed in a direction in which the lower beams are separated from the flight vehicle.

According to the aspect of the foregoing (1), a landing gear for a flight vehicle is used during landing. The landing gear for a flight vehicle includes a first cylinder structure configured to have an upper end which is coupled to be able to roll with respect to the flight vehicle; and a second cylinder structure configured to have a lower end which is able to come into contact with the ground, configured to be able to relatively move in an axial direction along a reference axis with respect to the first cylinder structure, and configured to be able to relatively rotate about the reference axis with respect to the first cylinder structure. The first cylinder structure and the second cylinder structure switch the landing gear between a stowed state and a released state by means of the relative movement and the relative rotation. Thus, the following effect is exhibited.

The landing gear can switch between the stowed state and the released state by means of the relative movement and the relative rotation of the first cylinder structure and the second cylinder structure. For this reason, every time the flight vehicle flies there is no need to produce and replace a landing gear. Therefore, a reusable landing gear for a flight vehicle can be provided.

According to the aspect of the foregoing (2), the first cylinder structure includes an upper cylinder having an upper end which is coupled to be able to roll with respect to the flight vehicle, and a rotation mechanism provided in the upper cylinder and able to rotate about the reference axis. The second cylinder structure includes a lower cylinder having a lower end which is able to come into contact with the ground and able to move in the axial direction with respect to the upper cylinder, and a guide structure provided in the lower cylinder and guiding rotation of the rotation mechanism about the reference axis and movement in the axial direction. Thus, the following effect is exhibited.

The landing gear can switch between the stowed state and the released state by means of rotation of the rotation mechanism about the reference axis and movement in the axial direction with respect to the guide structure.

According to the aspect of the foregoing (3), the rotation mechanism alternately establishes the stowed state and the released state of the landing gear by alternately repeating the rotation and the movement with respect to the guide structure in accordance with movement of the lower cylinder in the axial direction. Thus, the following effect is exhibited.

The stowed state and the released state of the landing gear can be alternately established by the rotation mechanism alternately repeating the rotation and the movement with respect to the guide structure.

According to the aspect of the foregoing (4), the lower cylinder includes a lower cylinder body having a cylindrical shape along the reference axis, and seat surface portions provided at an upper end of the lower cylinder body. The rotation mechanism includes a rotation cylinder body having a cylindrical shape along the reference axis, and abutting portions provided at a lower end of the rotation cylinder body and abutting the seat surface portions in the released state. Thus, the following effect is exhibited.

The released state of the landing gear can be maintained by the abutting portions of the rotation mechanism abutting the seat surface portions of the lower cylinder in the released state of the landing gear. For this reason, there is no need to provide a mechanism for maintaining the released state. Therefore, weight reduction, miniaturization, and cost control of the landing gear can be achieved.

According to the aspect of the foregoing (5), the abutting portions cancel abutment with respect to the seat surface portions by means of the rotation of the rotation mechanism. Thus, the following effect is exhibited.

The landing gear can be shifted from the released state to the stowed state by the abutting portions of the rotation mechanism canceling abutment with respect to the seat surface portions by means of the rotation of the rotation mechanism. For this reason, there is no need to provide a mechanism for canceling abutment of the abutting portions with respect to the seat surface portions. Therefore, weight reduction, miniaturization, and cost control of the landing gear can be achieved.

According to the aspect of the foregoing (6), regarding the seat surface portions, a plurality of seat surface portions protrude from an inner circumference of the upper end of the lower cylinder body to an inward side of the lower cylinder body in a radial direction and are provided with a gap therebetween in a circumference direction of the lower cylinder body. Regarding the abutting portions, a plurality of abutting portions protrude from an outer circumference of the lower end of the rotation cylinder body to an outward side of the rotation cylinder body in the radial direction and are provided with a gap therebetween in the circumference direction of the rotation cylinder body. Thus, the following effect is exhibited.

The released state of the landing gear can be stably maintained by the plurality of abutting portions respectively abutting the plurality of seat surface portions. On the other hand, the landing gear can be shifted from the released state to the stowed state by canceling abutment of each of the abutting portions with respect to each of the seat surface portions. In a case of shifting to the stowed state, each of the abutting portions of the rotation cylinder body passes through the interval (gap) between the seat surface portions of the lower cylinder body in the circumference direction. Therefore, extension of the landing gear to the outward side of the lower cylinder body in the radial direction can be curbed.

According to the aspect of the foregoing (7), regarding the seat surface portions, three seat surface portions are provided and have a rotationally symmetrical shape of three-fold symmetry with respect to a center of the lower cylinder body when viewed in the axial direction. Regarding the abutting portions, three abutting portions are provided and have a rotationally symmetrical shape of three-fold symmetry with respect to a center of the rotation cylinder body when viewed in the axial direction. Thus, the following effect is exhibited.

Incidentally, when two seat surface portions and two abutting portions are provided (when they are disposed with an interval therebetween with a central angle of 180° when viewed in the axial direction), a distance for the rotation mechanism to be rotated becomes longer, and there is a need to increase an overstroke by an amount corresponding thereto. On the other hand, when four or more seat surface portions and four or more abutting portions are provided, areas for each of the seat surface portions and each of the abutting portions become smaller, and there is a probability that the tolerance with respect to a load and a shock at the time of landing will decrease.

In contrast, according to the present aspect, increase in overstroke can be curbed and decrease in tolerance with respect to a load and a shock at the time of landing can be curbed by providing three seat surface portions and three abutting portions in three-fold symmetry.

According to the aspect of the foregoing (8), the lower cylinder body includes sliding grooves allowing the abutting portions to slide therein. The sliding grooves extend parallel to the axial direction from the upper end to the lower end of the lower cylinder body in the inner circumference of the lower cylinder body. Thus, the following effect is exhibited.

When the landing gear is stowed or released, the abutting portions at the lower end of the rotation cylinder body can be moved parallel to the axial direction along the sliding grooves in the inner circumference of the lower cylinder body. Therefore, the rotation mechanism can be stably moved with respect to the lower cylinder. Furthermore, when the rotation mechanism is attached to the tip of the rod of the shock absorber, swing of the rotation mechanism can be curbed. Therefore, deterioration of the shock absorber can be curbed.

According to the aspect of the foregoing (9), the lower cylinder includes a lower cylinder body having a cylindrical shape along the reference axis, and seat surface portions provided at an upper end of the lower cylinder body. The guide structure includes a guide cylinder body provided on the upper end side of the upper cylinder from the seat surface portions in the axial direction and having a cylindrical shape along the reference axis, and a plurality of groove structures regularly provided in the circumference direction in an inner circumference of the guide cylinder body. The rotation mechanism includes a rotation cylinder body having a cylindrical shape along the reference axis, and a plurality of projection structures regularly provided in the circumference direction in an outer circumference of the rotation cylinder body. Thus, the following effect is exhibited.

The rotation mechanism can alternately repeat rotation and movement with respect to the guide structure by means of cooperation between the regularly provided groove structures of the guide structure and the regularly provided projection structures of the rotation mechanism. For this reason, there is no need to provide a mechanism for applying motive power for operating the rotation mechanism. Therefore, weight reduction, miniaturization, and cost control of the landing gear can be achieved.

According to the aspect of the foregoing (10), the groove structures each include a first groove extending parallel to the axial direction from the upper end to the lower end of the guide cylinder body; a second groove extending obliquely with respect to the axial direction from a middle part of the first groove toward the upper end of the guide cylinder body and opening at the upper end of the guide cylinder body; and a third groove provided on the lower end side of the guide cylinder body from the second groove, extending obliquely with respect to the axial direction from a middle part of the first groove toward the lower end of the guide cylinder body, and opening at the lower end of the guide cylinder body. The projection structure includes extending portions extending parallel to the axial direction from the upper end to the lower end of the rotation cylinder body; and first projecting portions and second projecting portions protruding from the extending portions to the outward side of the rotation cylinder body in the radial direction and provided with a gap therebetween in the circumference direction and the axial direction of the rotation cylinder body in a manner of being able to slide in any of the first groove, the second groove, and the third groove. Thus, the following effect is exhibited.

The rotation mechanism can alternately repeat rotation and movement with respect to the guide structure by means of cooperation between the first groove, the second groove, and the third groove of the groove structures and the first projecting portions and the second projecting portions of the projection structure. For this reason, there is no need to provide a mechanism for applying motive power for operating the rotation mechanism. Therefore, weight reduction, miniaturization, and cost control of the landing gear can be achieved. Furthermore, the lower cylinder can be smoothly moved in the axial direction and the landing gear can be smoothly stowed and released by obliquely providing the second groove and the third groove with respect to the first groove.

According to the aspect of the foregoing (11), a shock absorber is stowed inside the upper cylinder. The shock absorber includes a rod extending in the axial direction and able to rotate about the reference axis. The rotation mechanism is attached to a tip of the rod. Thus, the following effect is exhibited.

A shock at the time of landing transmitted to the lower end of the rotation mechanism from the upper end of the lower cylinder can be absorbed by the shock absorber. Furthermore, since the rod of the shock absorber can rotate about the reference axis and the rotation mechanism is attached to the tip of the rod, there is no need to provide a mechanism for rotating the rotation mechanism. Therefore, weight reduction, miniaturization, and cost control of the landing gear can be achieved.

According to the aspect of the foregoing (12), the landing gear for a flight vehicle further includes lower beams configured to each have a first end which is coupled to be able to roll with respect to the flight vehicle and have a second end which is coupled to be able to roll with respect to the lower cylinder. Thus, the following effect is exhibited.

When the stowed state and the released state of the landing gear are alternately established, the lower cylinder can be stably supported by the lower beams. For example, when the flight vehicle flies, the landing gear can be stowed compactly by bringing the lower beams closer to the flight vehicle and moving the lower cylinder to the upper end side of the upper cylinder. For example, when the flight vehicle is landing, the flight vehicle can be made stable by disposing the lower end of the lower cylinder away from the flight vehicle.

According to the aspect of the foregoing (13), regarding the lower beams, a pair of lower beams are provided such that the first ends are coupled to two spots in the flight vehicle. An actuator for driving the landing gear and a transmission arm for transmitting a driving force of the actuator to the lower cylinder are provided between the pair of lower beams. Thus, the following effect is exhibited.

A load when the lower end of the lower cylinder comes into contact with the ground in the released state of the landing gear can be received by the transmission arm. Therefore, burdens applied to other spots at the time of landing can be reduced. For example, a structure for protecting the actuator can be realized by the transmission arm absorbing a landing load.

Incidentally, when the actuator is attached to each of the pair of lower beams, there is a need for the actuator to play a role of absorbing a shock at the time of landing so that there is a probability that the size of the actuator will increase. In contrast, according to the present aspect, the actuator need only have a driving force for driving the landing gear by providing the actuator between the pair of lower beams. Therefore, the actuator can be miniaturized, and the costs can also be controlled.

According to the aspect of the foregoing (14), the actuator is surrounded by the flight vehicle, the lower cylinder, and the pair of lower beams in the stowed state. Thus, the following effect is exhibited.

The actuator in the stowed state can be protected from an external factor by the flight vehicle, the lower cylinder, and the pair of lower beams. For example, wear of the actuator can be prevented by the landing gear covering the actuator while the flight vehicle is flying when the landing gear is folded.

Incidentally, if components, such as an actuator, project considerably to the outward side of the flight vehicle in the radial direction while the landing gear is in the stowed state, there is a probability that aerodynamic performance of the flight vehicle will decrease. In contrast, according to the present aspect, since the actuator is surrounded by the flight vehicle, the lower cylinder, and the pair of lower beams while the landing gear is in the stowed state, components projecting to the outward side of the flight vehicle in the radial direction can be made compact as much as possible. Therefore, decrease in aerodynamic performance of the flight vehicle can be minimized.

According to the aspect of the foregoing (15), when the landing gear is shifted from the released state to the stowed state, operation is performed in a direction in which the lower beams are separated from the flight vehicle. Thus, the following effect is exhibited.

The direction in which the lower beams are separated from the flight vehicle is a direction in which the lower end of the rotation mechanism is separated from the upper end of the lower cylinder. For this reason, the rotation mechanism can be operated in a state in which no extra force is applied to the lower end of the rotation mechanism. Therefore, the rotation mechanism can be smoothly operated.

BRIEF DESCRIPTION OF THE DRAWINGS

FIG. 19 is an explanatory view of one-motion operation of a transmission arm and a cylinder mechanism of the embodiment.

DETAILED DESCRIPTION OF THE INVENTION

Hereinafter, an embodiment of the present invention will be described with reference to the drawings. In the embodiment, description will be given by exemplifying a landing gear for a flight vehicle used during landing.

<Landing Gear for Flight Vehicle>

Figure 1:
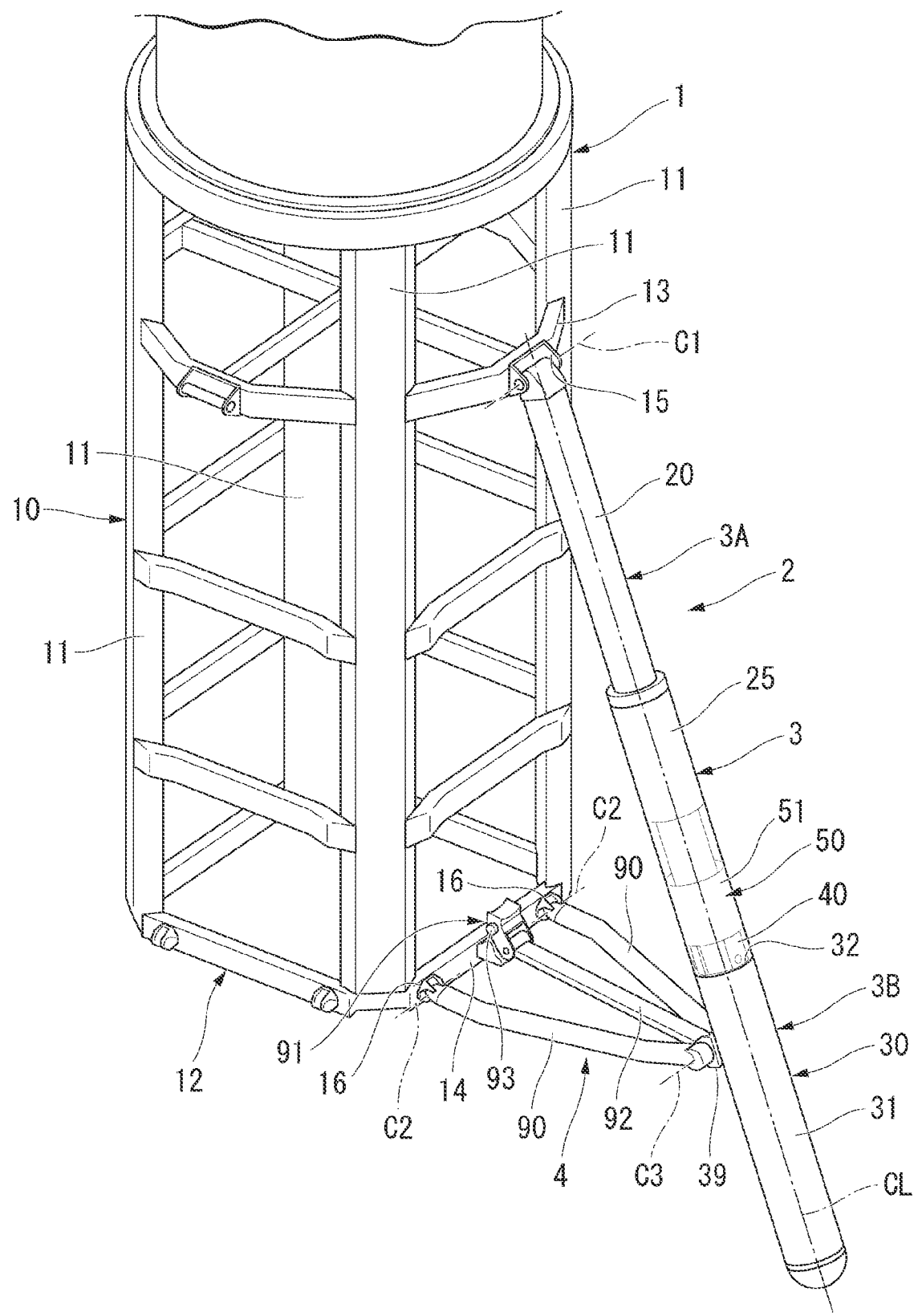
FIG. 1 is a perspective view illustrating a released state of a landing gear for a flight vehicle of an embodiment.

As illustrated in FIG. 1, a landing gear 2 for a flight vehicle 1 (which will hereinafter be simply referred to as "a landing gear 2") includes a cylinder mechanism 3 which can extend and contract in an axial direction along a reference axis CL, and a link mechanism 4 for coupling the flight vehicle 1 and the cylinder mechanism 3 to each other. The landing gear 2 can switch between a released state illustrated in FIG. 1 and a stowed state illustrated in FIG. 2.

The example of FIG. 1 illustrates a state in which the flight vehicle 1 vertically stands upright with respect to the ground. In FIG. 1, the upward side on this paper corresponds to the upward side in a vertical direction. In FIG. 1, the downward side on this paper corresponds to the downward side in the vertical direction (ground side). The flight vehicle 1 includes a lower structure 10 extending in an up-down direction (vertical direction). A plurality of (for example, four) landing gears 2 are provided in the lower structure 10 of the flight vehicle 1. In the example of FIG. 1, one of four landing gears 2 is illustrated, and illustration of the remaining landing gears 2 is omitted.

The lower structure 10 includes a plurality of struts 11 extending in the up-down direction, and horizontal structures 12 for coupling two adjacent struts 11 to each other. Four struts 11 are provided. The four struts 11 are disposed at positions corresponding to corner portions of a square when viewed in the up-down direction.

The horizontal structures 12 each include an upper horizontal member 13 for coupling upper portions of two adjacent struts 11 to each other, and a lower horizontal member 14 for coupling lower ends of the two adjacent struts 11 to each other. The upper horizontal member 13 is curved toward the outward side of the lower structure 10 when viewed in the up-down direction. The lower horizontal members 14 are disposed at positions corresponding to side portions of the square when viewed in the up-down direction.

<Cylinder Mechanism>

The cylinder mechanism 3 includes a first cylinder structure 3A having an upper end which is coupled to be able to roll with respect to the flight vehicle 1; and a second cylinder structure 3B having a lower end which is able to come into contact with the ground, configured to be able to relatively move in the axial direction along the reference axis CL with respect to the first cylinder structure 3A, and configured to be able to rotate about the reference axis CL with respect to the first cylinder structure 3A. The first cylinder structure 3A and the second cylinder structure 3B switch the landing gear 2 between the stowed state and the released state by means of relative movement and relative rotation.

The first cylinder structure 3A includes an upper cylinder 20 having an upper end which is coupled to be able to roll with respect to the flight vehicle 1, and a rotation mechanism 40 provided in the upper cylinder 20 and able to rotate about the reference axis CL.

The second cylinder structure 3B includes a lower cylinder 30 having a lower end which is able to come into contact with the ground and able to move in the axial direction along the reference axis CL with respect to the upper cylinder 20, and a guide structure 50 provided in the lower cylinder 30 and guiding rotation of the rotation mechanism 40 about the reference axis CL and movement in the axial direction.

<Upper Cylinder>

The upper cylinder 20 constitutes an inner cylinder of the cylinder mechanism 3. The upper cylinder 20 is formed to have a cylindrical shape along the reference axis CL. The upper end of the upper cylinder 20 is coupled to be able to roll with respect to the flight vehicle 1 via a joint 15 provided in the upper horizontal member 13. The upper end of the upper cylinder 20 can turn around an axis C1 of the joint 15 provided in the upper horizontal member 13. The axis C1 of the joint 15 (which will hereinafter be referred to as "a first axis C1") provided in the upper horizontal member 13 is orthogonal to the reference axis CL. The first axis C1 is parallel to a straight line connecting the centers of two struts 11 positioned on both end sides of the upper horizontal member 13 when viewed in the up-down direction. The upper end of the upper cylinder 20 may be provided such that it can turn about the reference axis CL.

Figure 4:
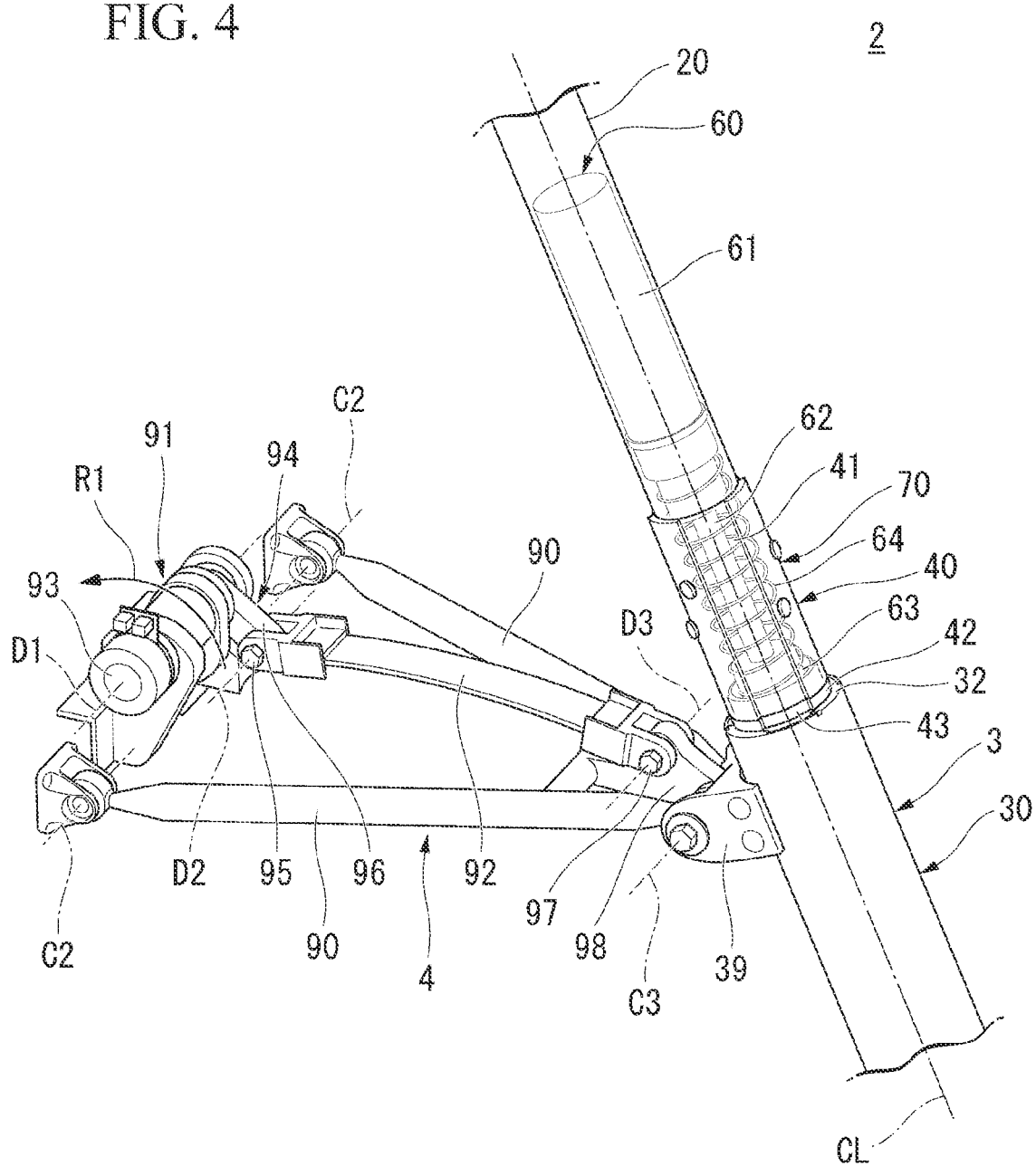
FIG. 4 is an enlarged perspective view of a part of the landing gear for a flight vehicle of the embodiment.

As illustrated in FIG. 4, a shock absorber 60 is stowed inside the upper cylinder 20. The shock absorber 60 is a shock absorbing device which absorbs a shock acting on the landing gear 2. The shock absorber 60 can extend and contract in the axial direction along the reference axis CL with respect to the upper cylinder 20.

Figure 5:
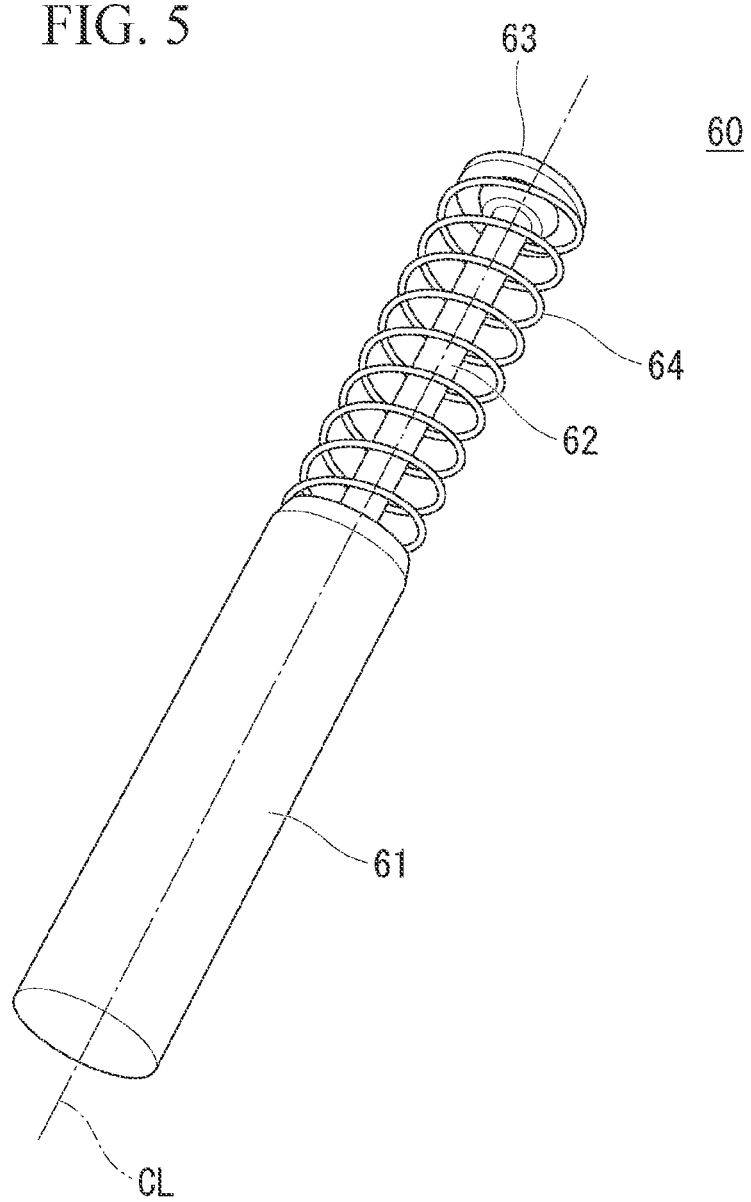
FIG. 5 is a perspective view of a shock absorber of the embodiment.

As illustrated in FIG. 5, the shock absorber 60 includes an inner cylinder 61 which is formed to have a cylindrical shape along the reference axis CL and provided on the inward side of the upper cylinder 20 in a radial direction, a rod 62 which extends in the axial direction and is able to rotate about the reference axis CL, a cap 63 which is attached to a tip of the rod 62 (the lower end in the axial direction), and a spring 64 which is provided between the inner cylinder 61 and the cap 63. The cap 63 is provided with a female screw portion (not illustrated) into which a bolt can be screwed.

<Lower Cylinder>

Figure 3:
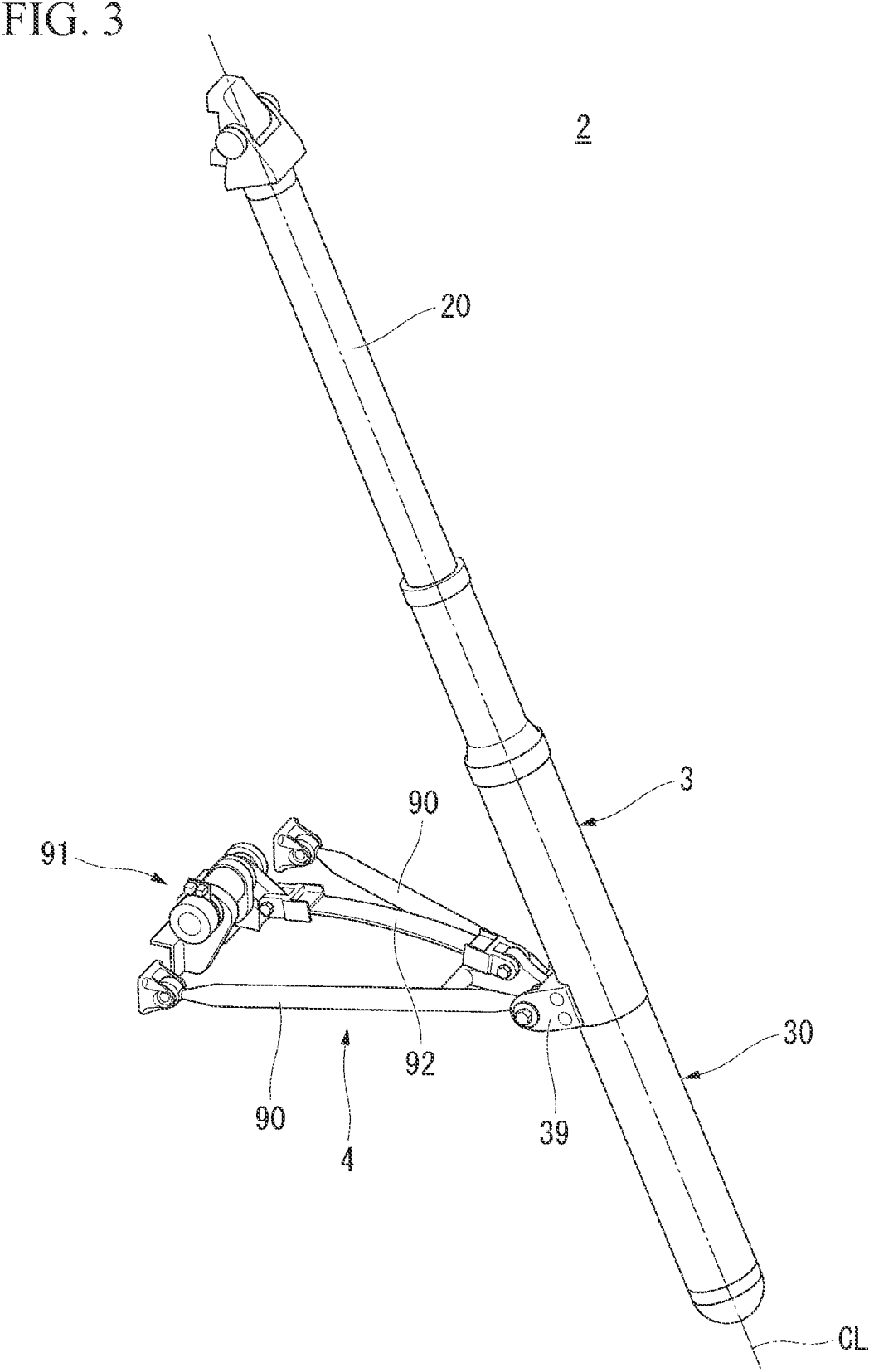
FIG. 3 is an overall perspective view of the landing gear for a flight vehicle of the embodiment.
Figure 8:
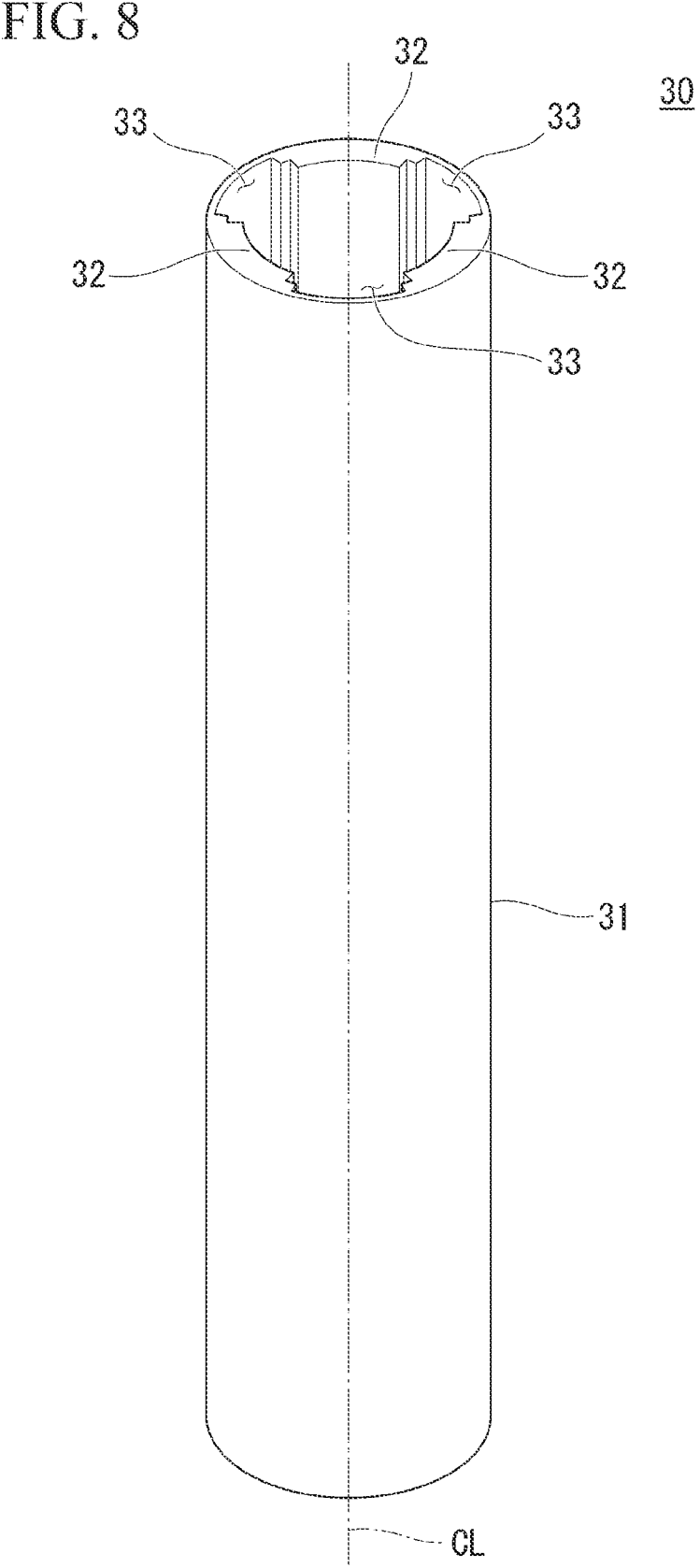
FIG. 8 is a perspective view of a lower cylinder of the embodiment.

As illustrated in FIG. 3, the lower cylinder 30 constitutes an outer cylinder of the cylinder mechanism 3. The lower cylinder 30 can move in the axial direction along the reference axis CL with respect to the upper cylinder 20. The lower cylinder 30 is provided coaxially with the upper cylinder 20. As illustrated in FIG. 8, the lower cylinder 30 includes a lower cylinder body 31 having a cylindrical shape along the reference axis CL, and seat surface portions 32 provided at an upper end of the lower cylinder body 31.

Figure 2:
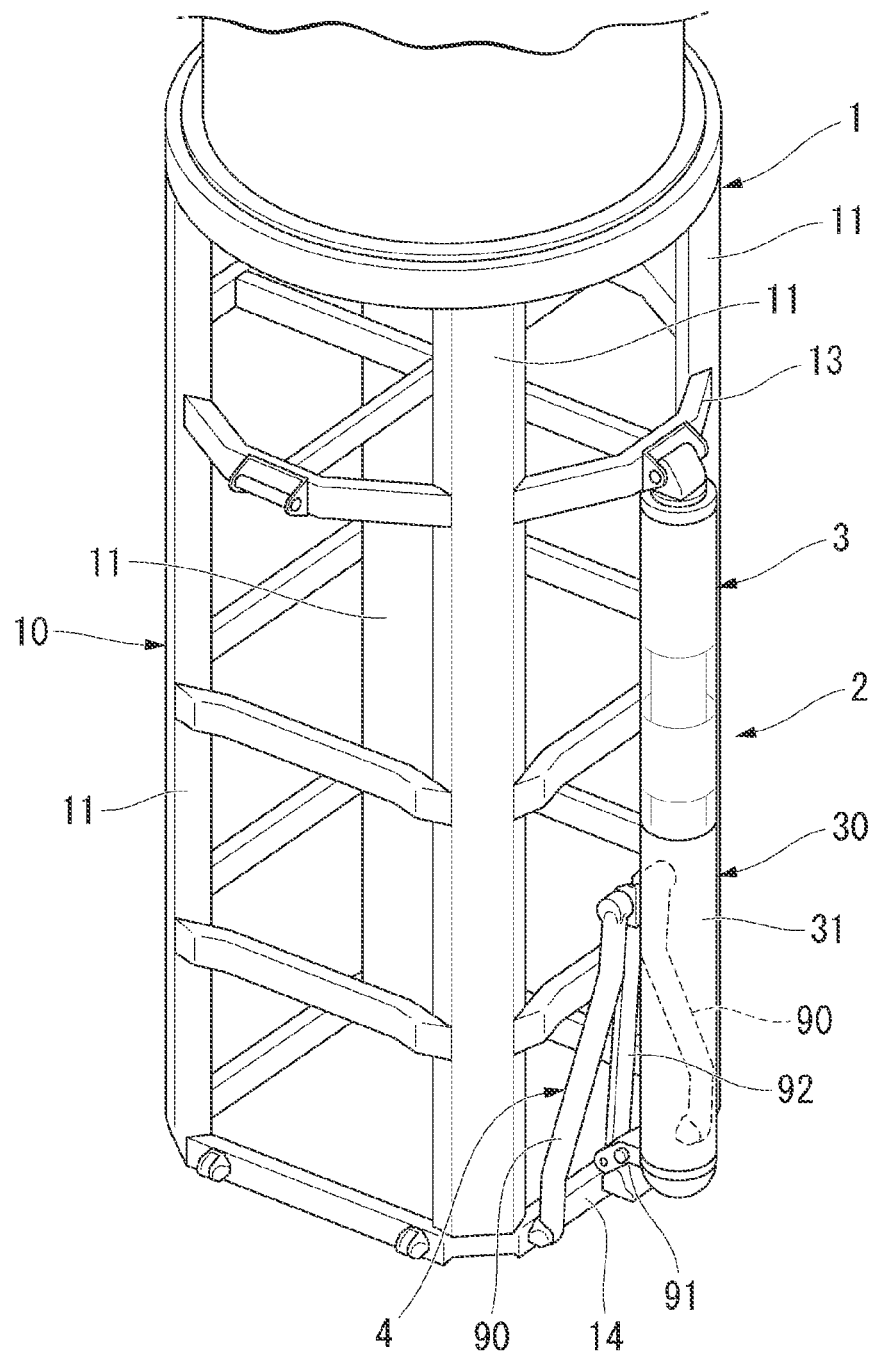
FIG. 2 is a perspective view illustrating a stowed state of the landing gear for a flight vehicle of the embodiment.

As illustrated in FIG. 1, the external shape of the lower cylinder body 31 is larger than the external shape of the upper cylinder 20 when viewed in the axial direction. A lower end of the lower cylinder body 31 can come into contact with the ground in the released state. As illustrated in FIG. 2, the lower end of the lower cylinder body 31 is brought closer to the lower horizontal member 14 in the stowed state.

As illustrated in FIG. 8, the seat surface portions 32 protrude from an inner circumference of the upper end of the lower cylinder body 31 to the inward side of the lower cylinder body 31 in the radial direction. Regarding the seat surface portions 32, a plurality of seat surface portions are provided with a gap therebetween in a circumference direction of the lower cylinder body 31. Three seat surface portions 32 are provided.

Figure 9:
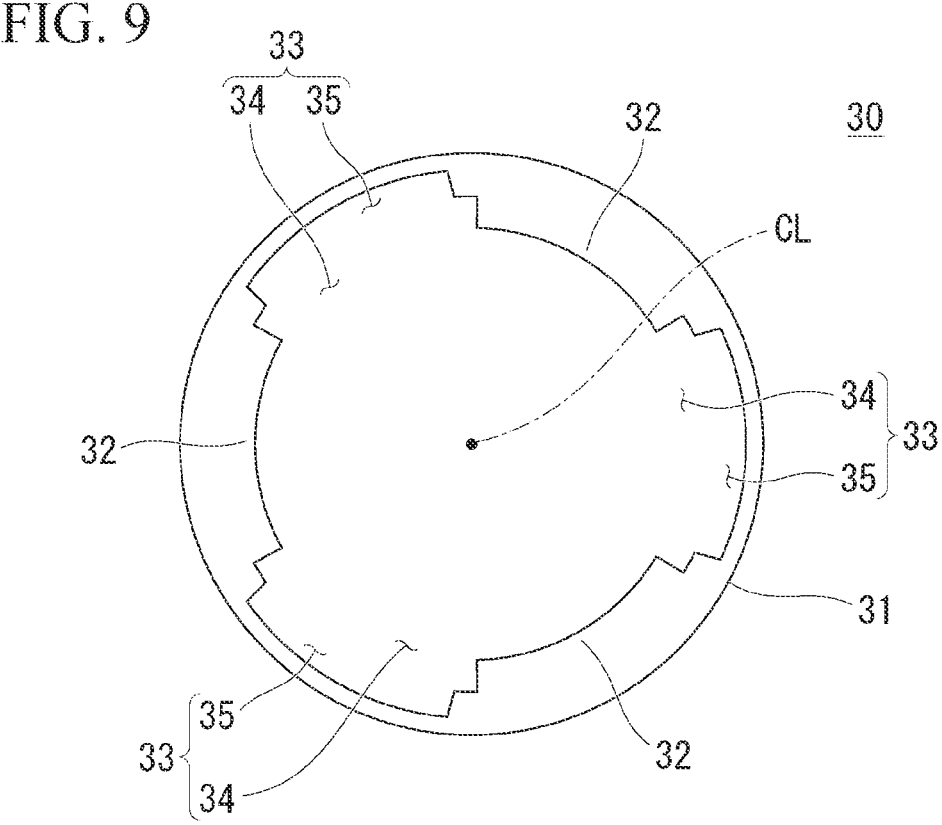
FIG. 9 is an explanatory view of disposition of abutting portions and seat surface portions in the released state of the embodiment.
Figure 9:
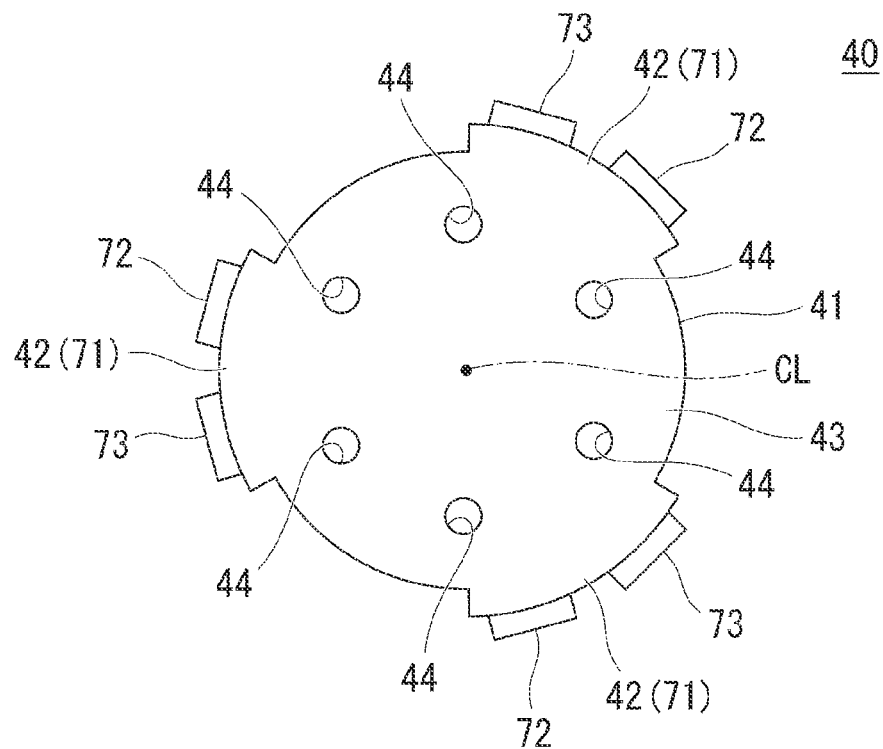
Figure 10:
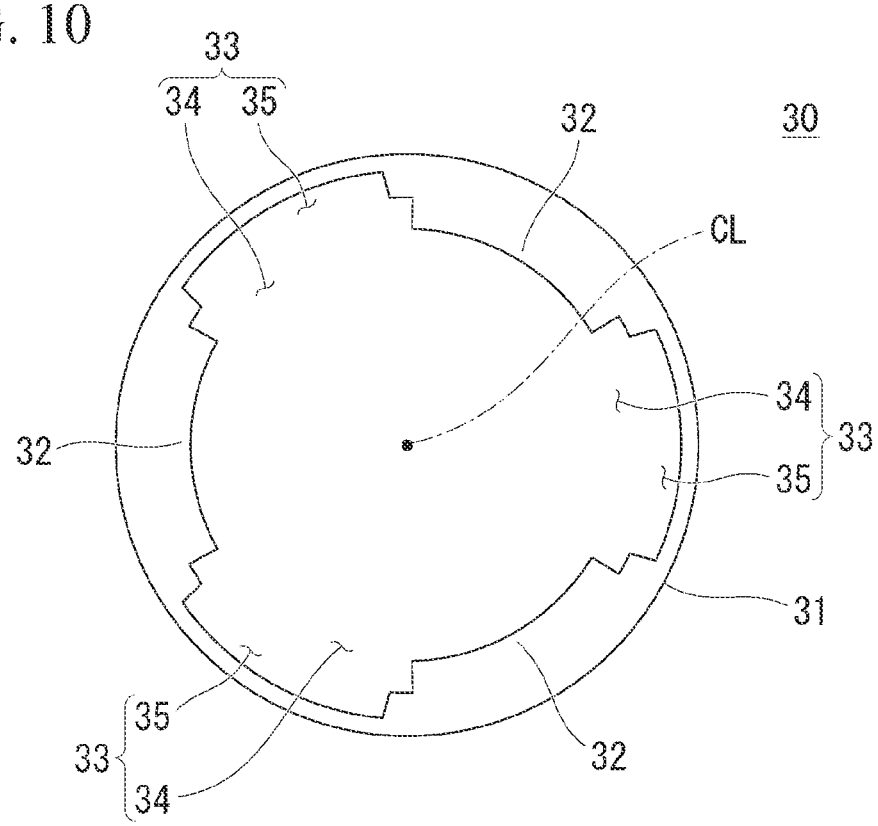
FIG. 10 is an explanatory view of disposition of the abutting portions and the seat surface portions in the stowed state of the embodiment.
Figure 10:
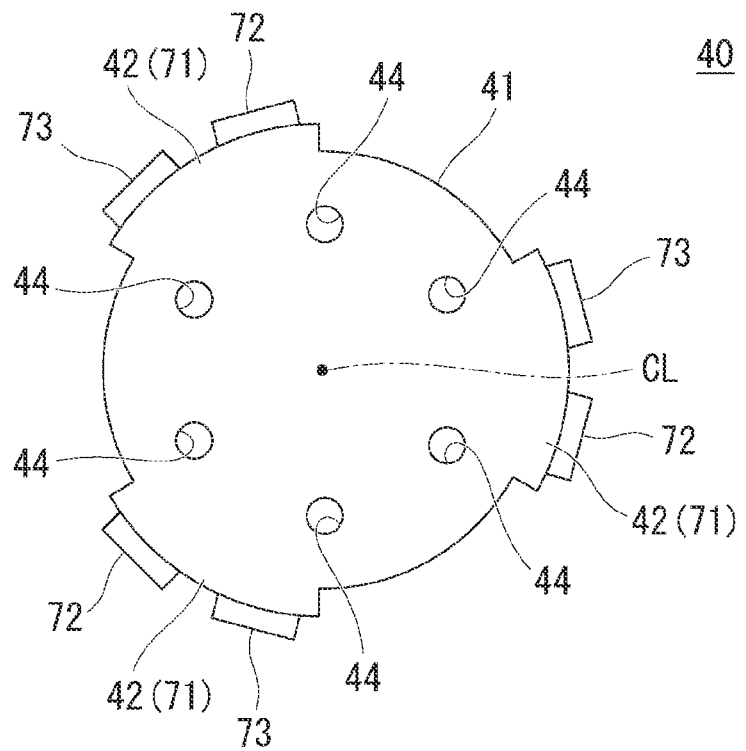

FIG. 9 is an explanatory view of disposition of abutting portions and seat surface portions in the released state of the embodiment. FIG. 10 is an explanatory view of disposition of the abutting portions and the seat surface portions in the stowed state of the embodiment. In each diagram, the upper stage on this paper illustrates "the lower cylinder including the seat surface portions", and the lower stage on this paper illustrates "the rotation mechanism including the abutting portions", respectively.

As illustrated in FIG. 10, the seat surface portions 32 have a rotationally symmetrical shape of three-fold symmetry with respect to the center of the lower cylinder body 31 when viewed in the axial direction. The seat surface portions 32 are formed to have an arc shape along an outer circumference of a rotation cylinder body 41 of the rotation mechanism 40 when viewed in the axial direction.

The lower cylinder body 31 includes sliding grooves 33 allowing abutting portions 42 of the rotation mechanism 40 to slide therein. The sliding grooves 33 extend parallel to the axial direction from the upper end to the lower end of the lower cylinder body 31 in the inner circumference of the lower cylinder body 31. Regarding the sliding grooves 33, a plurality of sliding grooves are provided with a gap therebetween in the circumference direction of the lower cylinder body 31. Three sliding grooves 33 are provided. The sliding grooves 33 have a rotationally symmetrical shape of three-fold symmetry with respect to the center of the lower cylinder body 31 when viewed in the axial direction. Each of the sliding groove 33 is provided between two seat surface portions 32 adjacent to each other in the circumference direction when viewed in the axial direction. The sliding groove 33 includes an inner groove 34 formed on the inward side of the lower cylinder body 31 in the radial direction, and an outer groove 35 connected to the inner groove 34 when viewed in the axial direction.

<Rotation Mechanism>

The rotation mechanism 40 alternately establishes the stowed state and the released state of the landing gear 2 by alternately repeating rotation and movement with respect to the guide structure 50 in accordance with movement of the lower cylinder 30 in the axial direction. As illustrated in FIG. 4, the rotation mechanism 40 is provided coaxially with the upper cylinder 20. The rotation mechanism 40 includes the rotation cylinder body 41 having a cylindrical shape along the reference axis CL, the abutting portions 42 provided at the lower end of the rotation cylinder body 41 and abutting the seat surface portions 32 in the released state, a plurality of projection structures 70 regularly provided in the circumference direction in an outer circumference of the rotation cylinder body 41, and a lid body 43 provided at the lower end of the rotation cylinder body 41.

The external shape of the rotation cylinder body 41 is larger than the external shape of the upper cylinder 20 when viewed in the axial direction. The external shape of the rotation cylinder body 41 is smaller than the external shape of the lower cylinder body 31 when viewed in the axial direction. An inner circumferential surface of the rotation cylinder body 41 is formed to have a circular shape along an inner circumferential surface of the upper cylinder 20 when viewed in the axial direction. As illustrated in FIG. 10, an outer circumferential surface of the rotation cylinder body 41 is curved along an inner circumferential surface of the lower cylinder body 31 (arc-shaped surfaces of the seat surface portions 32) when viewed in the axial direction.

As illustrated in FIG. 4, the abutting portions 42 abut the seat surface portions 32 in the released state. The abutting portions 42 cancel abutment with respect to the seat surface portions 32 by means of rotation of the rotation mechanism 40. The abutting portions 42 protrude from an outer circumference of the lower end of the rotation cylinder body 41 to an outward side of the rotation cylinder body 41 in the radial direction. Regarding the abutting portions 42, a plurality of abutting portions are provided with a gap therebetween in the circumference direction of the rotation cylinder body 41. Three abutting portions 42 are provided.

As illustrated in FIG. 9, the abutting portions 42 have a rotationally symmetrical shape of three-fold symmetry with respect to the center of the rotation cylinder body 41 when viewed in the axial direction. The abutting portions 42 are formed to have an arc shape along the outer circumference of the rotation cylinder body 41 when viewed in the axial direction. Each of the abutting portions 42 overlaps one of the seat surface portions 32 when viewed in the axial direction in the released state. As illustrated in FIG. 10, each of the abutting portions 42 overlaps the inner groove 34 of one of the sliding grooves 33 when viewed in the axial direction in the stowed state.

Figure 6:
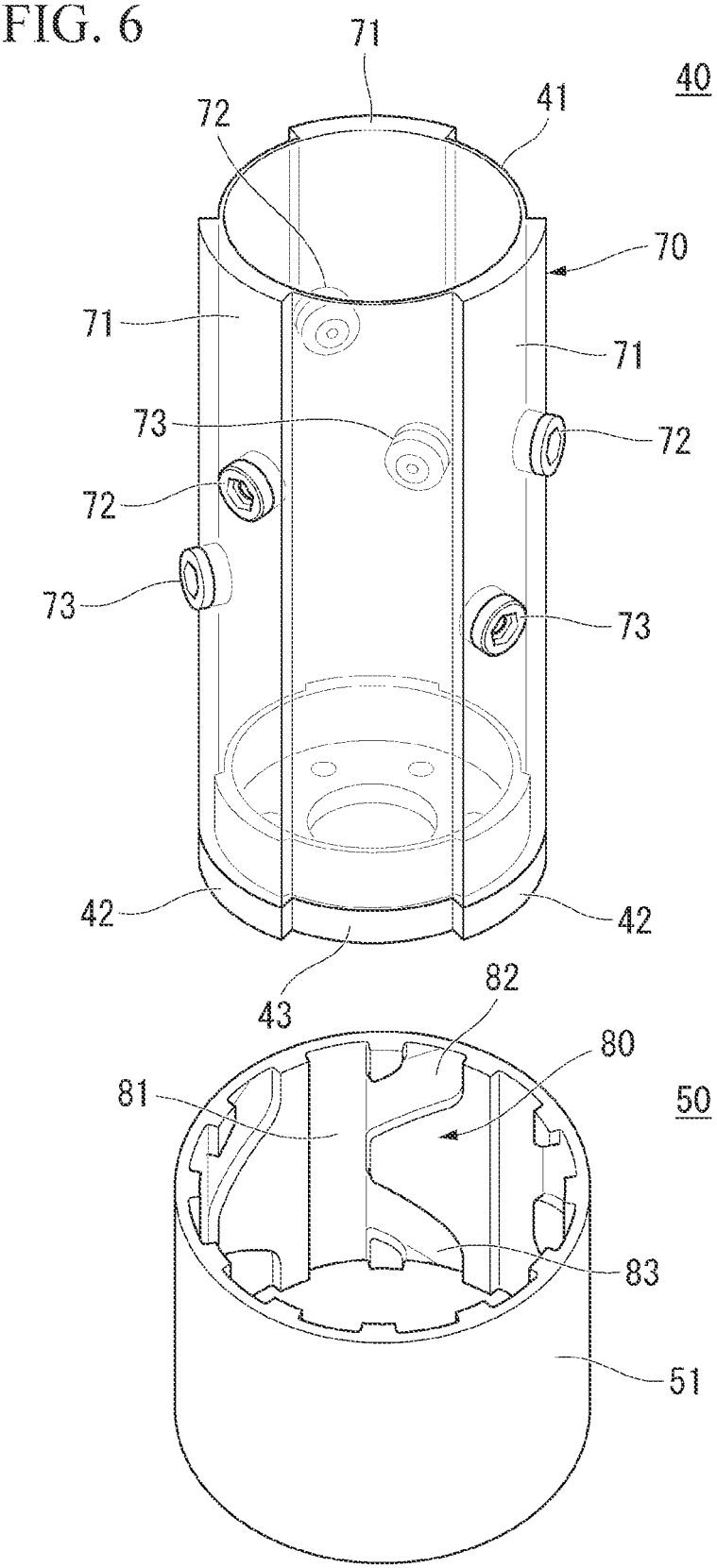
FIG. 6 is a perspective view illustrating a rotation mechanism and a guide structure of the embodiment.

FIG. 6 is a perspective view illustrating the rotation mechanism and the guide structure of the embodiment. In FIG. 10, the upper stage on this paper illustrates "the rotation mechanism including the projection structures", and the lower stage on this paper illustrates "the guide structure including the groove structures", individually. As illustrated in FIG. 6, each of the projection structures 70 includes an extending portion 71 extending parallel to the axial direction from the upper end to the lower end of the rotation cylinder body 41, and a first projecting portion 72 and a second projecting portion 73 protruding from the extending portion 71 to the outward side of the rotation cylinder body 41 in the radial direction and provided with a gap therebetween in the circumference direction and the axial direction of the rotation cylinder body 41 in a manner of being able to slide in any of a first groove 81, a second groove 82, and a third groove 83 constituting a groove structure 80.

The extending portions 71 protrude from the outer circumference of the rotation cylinder body 41 to the outward side in the radial direction. Regarding the extending portions 71, a plurality of extending portions are provided with a gap therebetween in the circumference direction of the rotation cylinder body 41. Three extending portions 71 are provided. As illustrated in FIG. 9, the extending portions 71 have a rotationally symmetrical shape of three-fold symmetry with respect to the center of the rotation cylinder body 41 when viewed in the axial direction. The extending portions 71 are formed to have an arc shape along the outer circumference of the rotation cylinder body 41 when viewed in the axial direction. Each of the extending portions 71 overlaps one of the abutting portions 42 when viewed in the axial direction. As illustrated in FIG. 10, each of the extending portions 71 overlaps the inner groove 34 of one of the sliding grooves 33 when viewed in the axial direction in the stowed state.

As illustrated in FIG. 6, the first projecting portion 72 is provided in an upper portion of the extending portion 71. For example, the first projecting portion 72 is a rotor attached to the upper portion of the extending portion 71 with a bearing therebetween. The first projecting portion 72 has a circular shape when viewed in the radial direction of the rotation cylinder body 41. For example, the first projecting portion 72 may be a head portion of a bolt attached to a female screw portion provided in the upper portion of the extending portion 71. For example, the constitution form of the first projecting portions 72 can be changed in accordance with a requirement specification.

The second projecting portion 73 is provided in a lower portion of the extending portion 71. For example, the second projecting portion 73 is a rotor attached to the lower portion of the extending portion 71 with a bearing therebetween. The second projecting portion 73 has a circular shape when viewed in the radial direction of the rotation cylinder body 41. The first projecting portion 72 and the second projecting portion 73 are formed to have the same shape as each other. For example, the second projecting portion 73 may be a head portion of a bolt attached to a female screw portion provided in the lower portion of the extending portion 71. For example, the constitution form of the second projecting portions 73 can be changed in accordance with a requirement specification.

One first projecting portion 72 and one second projecting portion 73 are provided with respect to each of the three extending portion 71. As illustrated in FIG. 9, the first projecting portion 72 and the second projecting portion 73 have a rotationally symmetrical shape of three-fold symmetry with respect to the center of the rotation cylinder body 41 when viewed in the axial direction. The first projecting portion 72 and the second projecting portion 73 in each extending portion 71 are disposed with an interval therebetween with a central angle of 30° when viewed in the axial direction. Here, the central angle between the first projecting portion 72 and the second projecting portion 73 denotes an angle formed by a line segment passing through the center of the rotation cylinder body 41 and the center of the first projecting portion 72 and a line segment passing through the center of the rotation cylinder body 41 and the center of the second projecting portion 73 when viewed in the axial direction. As illustrated in FIG. 10, each of the first projecting portion 72 and the second projecting portion 73 overlaps the outer groove 35 of one of the sliding grooves 33 when viewed in the axial direction in the stowed state.

As illustrated in FIG. 9, the lid body 43 has a shape along the outer circumference of the rotation cylinder body 41 when viewed in the axial direction. The lid body 43 has a plurality of (six in the embodiment) insertion holes 44 through which bolts can be inserted. The six insertion holes 44 are disposed with an equal interval therebetween in the circumference direction of the lid body 43.

As illustrated in FIG. 4, the rotation mechanism 40 is attached to the tip of the rod 62. For example, a bolt is screwed into each female screw portion of the cap 63 by being inserted through each insertion hole 44 of the lid body 43. Accordingly, the lid body 43 of the rotation mechanism 40 can be fixed to the cap 63 of the tip of the rod 62.

<Guide Structure>

Figure 7:
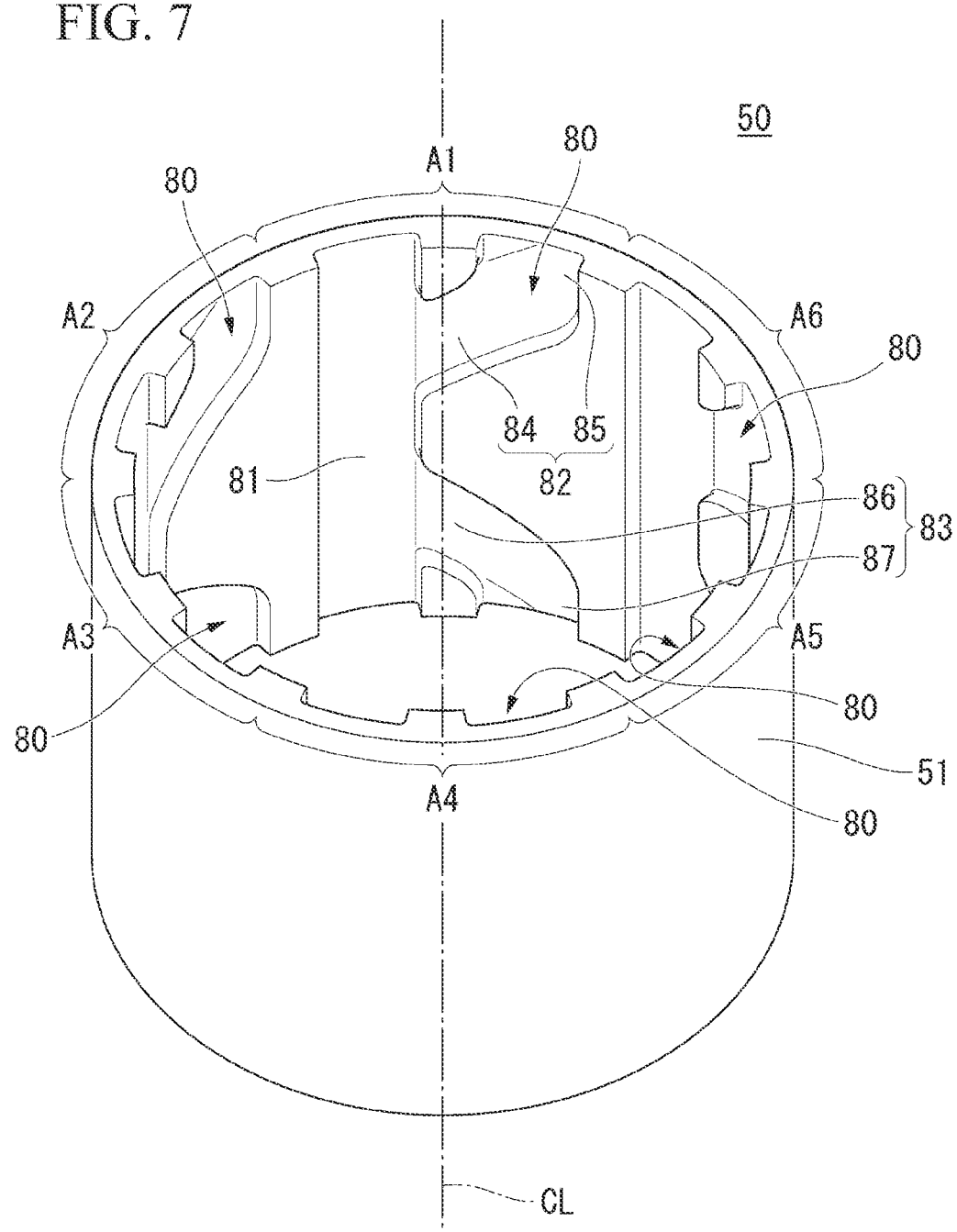
FIG. 7 is a perspective view of the guide structure of the embodiment.

As illustrated in FIG. 1, the guide structure 50 is provided coaxially with the upper cylinder 20. The guide structure 50 is provided on the upper end side of the upper cylinder 20 from the seat surface portions 32 in the axial direction. The guide structure 50 is fixed to the lower cylinder 30 by a bracket or the like. The guide structure 50 can move in the axial direction with respect to the upper cylinder 20 integrally with the lower cylinder 30. As illustrated in FIG. 7, the guide structure 50 includes a guide cylinder body 51 having a cylindrical shape along the reference axis CL, and a plurality of groove structures 80 regularly provided in the circumference direction in an inner circumference of the guide cylinder body 51.

As illustrated in FIG. 6, the external shape of the guide cylinder body 51 is larger than the external shape of the rotation cylinder body 41 when viewed in the axial direction. As illustrated in FIG. 1, a lower end of the guide cylinder body 51 is disposed on a side above the upper end of the lower cylinder body 31 in the axial direction. The reference sign 25 in the diagram indicates a slider provided on a side above an upper end of the guide cylinder body 51 in the axial direction. The slider 25 is formed to have a cylindrical shape along an outer circumference of the upper cylinder 20.

As illustrated in FIG. 7, the groove structures 80 are provided in six regions A1 to A6 in the circumference direction of the guide cylinder body 51. The six regions A1 to A6 are regions in the guide cylinder body 51 equally divided into six in the circumference direction when viewed in the axial direction. The groove structures 80 are recessed from an inner circumferential surface of the guide cylinder body 51 toward the outward side in the radial direction.

Each of the groove structures 80 includes the first groove 81 extending parallel to the axial direction from the upper end to the lower end of the guide cylinder body 51; the second groove 82 extending obliquely with respect to the axial direction from a middle part of the first groove 81 toward the upper end of the guide cylinder body 51 and opening at the upper end of the guide cylinder body 51; and the third groove 83 provided on the lower end side of the guide cylinder body 51 from the second groove 82, extending obliquely with respect to the axial direction from a middle part of the first groove 81 toward the lower end of the guide cylinder body 51, and opening at the lower end of the guide cylinder body 51.

The first groove 81 linearly extends parallel to the axial direction. The second groove 82 includes an upper oblique groove 84 extending obliquely from an upper portion of the first groove 81, and an upper opening groove 85 extending from an upper end of the upper oblique groove 84 toward the upper end of the guide cylinder body 51. The third groove 83 includes a lower oblique groove 86 extending obliquely from a lower portion of the first groove 81, and a lower opening groove 87 extending from a lower end of the lower oblique groove 86 toward the lower end of the guide cylinder body 51.

The first groove 81 has a rotationally symmetrical shape of six-fold symmetry with respect to the center of the guide cylinder body 51 when viewed in the axial direction. An upper opening groove 85 of the second groove 82 has a rotationally symmetrical shape of six-fold symmetry with respect to the center of the guide cylinder body 51. The first groove 81 and the upper opening groove 85 in each of the groove structures 80 are disposed with an interval therebetween with a central angle of 30° when viewed in the axial direction. Here, the central angle between the first groove 81 and the upper opening groove 85 denotes an angle formed by a line segment passing through the center of the guide cylinder body 51 and the center of the first groove 81 and a line segment passing through the center of the rotation cylinder body 41 and the center of the upper opening groove 85 when viewed in the axial direction.

The lower opening groove 87 of the third groove 83 is provided on an extended line of the upper opening groove 85 of the second groove 82. The lower opening groove 87 of the third groove 83 has a rotationally symmetrical shape of six-fold symmetry with respect to the center of the guide cylinder body 51. The first groove 81 and the lower opening groove 87 in each of the groove structures 80 are disposed with an interval therebetween with a central angle of 30° when viewed in the axial direction. Here, the central angle between the first groove 81 and the lower opening groove 87 denotes an angle formed by a line segment passing through the center of the guide cylinder body 51 and the center of the first groove 81 and a line segment passing through the center of the rotation cylinder body 41 and the center of the lower opening groove 87 when viewed in the axial direction. The first groove 81 and the upper opening groove 85 and the first groove 81 and the lower opening groove 87 in each of the groove structures 80 are disposed at the same central angle as each other when viewed in the axial direction.

<Link Mechanism>

As illustrated in FIG. 1, the link mechanism 4 includes lower beams 90 each have a first end which is coupled to be able to roll with respect to the flight vehicle 1 and have a second end which is coupled to be able to roll with respect to the lower cylinder 30. The first end of the lower beam 90 is coupled to be able to roll with respect to the flight vehicle 1 via a joint 16 provided in the lower horizontal member 14. The first end of the lower beam 90 can turn around an axis C2 of the joint 16 provided in the lower horizontal member 14. The axis C2 of the joint 16 (which will hereinafter be referred to as "a second axis C2") provided in the lower horizontal member 14 is parallel to a longitudinal direction of the lower horizontal member 14. The second axis C2 is parallel to the first axis C1.

The second end of the lower beam 90 is coupled to be able to roll with respect to the lower cylinder 30 via a joint 39 provided in the lower cylinder 30. The second end of the lower beam 90 can turn around an axis C3 of the joint 39 provided in the lower cylinder 30. The axis C3 of the joint 39 (which will hereinafter be referred to as "a third axis C3") provided in the lower cylinder 30 is parallel to the first axis C1. That is, the first axis C1, the second axis C2, and the third axis C3 are parallel to each other.

Regarding the lower beams 90, a pair of lower beams are provided such that the first ends are coupled to two spots in the flight vehicle 1. The first ends of the pair of lower beams 90 are coupled closer to the lower ends of two corresponding struts 11 in the lower horizontal member 14. The pair of lower beams 90 extend to the outward side in a horizontal direction respectively from the first ends in the released state and then extend toward the second ends on the lower cylinder 30 side such that they approach each other.

An actuator 91 for driving the landing gear 2 and a transmission arm 92 for transmitting a driving force of the actuator 91 to the lower cylinder 30 are provided between the pair of lower beams 90. The actuator 91 is attached to the center of the lower horizontal member 14 in the longitudinal direction. As illustrated in FIG. 2, the actuator 91 is surrounded by the flight vehicle 1, the lower cylinder 30, and the pair of lower beams 90 in the stowed state.

As illustrated in FIG. 4, the actuator 91 includes a motor 93, and a motive power transmission mechanism 94 for transmitting rotation motive power of the motor 93 to a first end of the transmission arm 92. The motor 93 has an output shaft for outputting rotation motive power of the motor 93. An axis D1 of the output shaft of the motor 93 (which will hereinafter be referred to as "an output axis D1") is parallel to the second axis C2.

The motive power transmission mechanism 94 includes a first transmission shaft 95 for transmitting rotation motive power of the motor 93 to the first end of the transmission arm 92, and a coupling member 96 for coupling the output shaft of the motor 93 and the first transmission shaft 95 to each other. The first transmission shaft 95 is disposed below the output shaft of the motor 93 in the released state. An axis D2 of the first transmission shaft 95 (which will hereinafter be referred to as "a first transmission axis D2") is parallel to the output axis D1.

The first end of the transmission arm 92 is coupled to be able to roll with respect to the motive power transmission mechanism 94. The first end of the transmission arm 92 can turn around the first transmission axis D2. A second end of the transmission arm 92 is coupled to be able to roll with respect to the lower beams 90 via a second transmission shaft 97 provided in a part of the lower beam 90 on the second end side, and a joint 98. An axis D3 of the second transmission shaft 97 (which will hereinafter be referred to as "a second transmission axis D3") is parallel to the first transmission axis D2. The second end of the transmission arm 92 can turn around the second transmission axis D3.

When the landing gear 2 is shifted from the released state illustrated in FIG. 1 to the stowed state illustrated in FIG. 2, operation is performed in a direction in which the lower beams 90 are separated from the flight vehicle 1. For example, in the released state illustrated in FIG. 4, the motor 93 is rotated (positive rotation) in an arrow R1 direction. Thereupon, since the first transmission shaft 95 moves in the arrow R1 direction, the first end of the transmission arm 92 is pulled in the arrow R1 direction. Thereupon, since the second end of the transmission arm 92 (second transmission shaft 97) moves downward, the lower cylinder 30 moves downward in the axial direction. That is, the cylinder mechanism 3 further extends from the released state illustrated in FIG. 1 (which will hereinafter be referred to as "an overstroke").

In an overstroke state, if the motor 93 is further rotated in the arrow R1 direction, the first transmission shaft 95 further moves in the arrow R1 direction, and thus the first end of the transmission arm 92 is further pulled in the arrow R1 direction. Thereupon, since the second end of the transmission arm 92 (second transmission shaft 97) moves upward, the lower cylinder 30 moves upward in the axial direction. That is, the cylinder mechanism 3 contracts from the overstroke state. Accordingly, the landing gear 2 shifts to the stowed state illustrated in FIG. 2. Therefore, the landing gear 2 can be shifted from the released state to the stowed state via the overstroke state by means of positive rotation of the motor 93.

On the other hand, when the landing gear 2 is shifted from the stowed state illustrated in FIG. 2 to the released state illustrated in FIG. 1, operation of shifting the landing gear 2 from the released state to the stowed state is reversely performed. For example, in the stowed state, the motor 93 is rotated in a direction opposite to the arrow R1 direction (reverse rotation). Thereupon, since the first transmission shaft 95 moves in a direction opposite to the arrow R1 direction, the first end of the transmission arm 92 is pressed in a direction opposite to the arrow R1 direction. Thereupon, since the second end of the transmission arm 92 (second transmission shaft 97) moves downward, the lower cylinder 30 moves downward in the axial direction. The cylinder mechanism 3 further extends from the released state and shifts to the overstroke state.

In the overstroke state, if the motor 93 is further rotated in a direction opposite to the arrow R1 direction, the first transmission shaft 95 further moves in a direction opposite to the arrow R1 direction, and thus the first end of the transmission arm 92 is pulled in a direction opposite to the arrow R1 direction. Thereupon, since the second end of the transmission arm 92 (second transmission shaft 97) moves upward, the lower cylinder 30 moves upward in the axial direction. That is, the cylinder mechanism 3 contracts from the overstroke state. Accordingly, the landing gear 2 shifts to the released state illustrated in FIG. 1. Therefore, the landing gear 2 can be shifted from the stowed state to the released state via the overstroke state by means of reverse rotation of the motor 93.

Example of Operation of Landing Gear

Next, using FIGS. 11 to 18, an example of operation of the landing gear 2 of the embodiment will be described.

Figure 11:
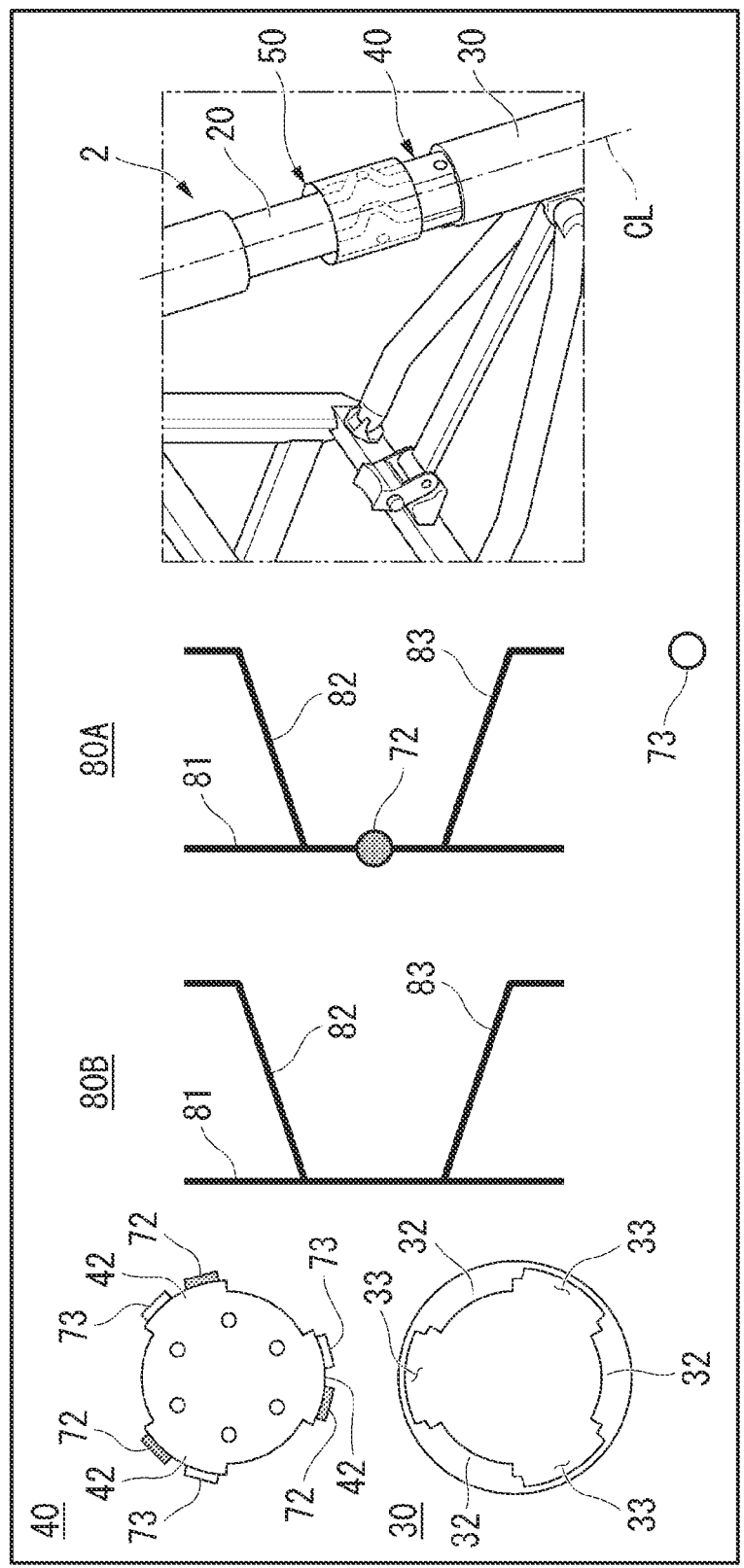
FIG. 11 is an explanatory view of operation of the rotation mechanism when the landing gear of the embodiment is extended.
Figure 12:
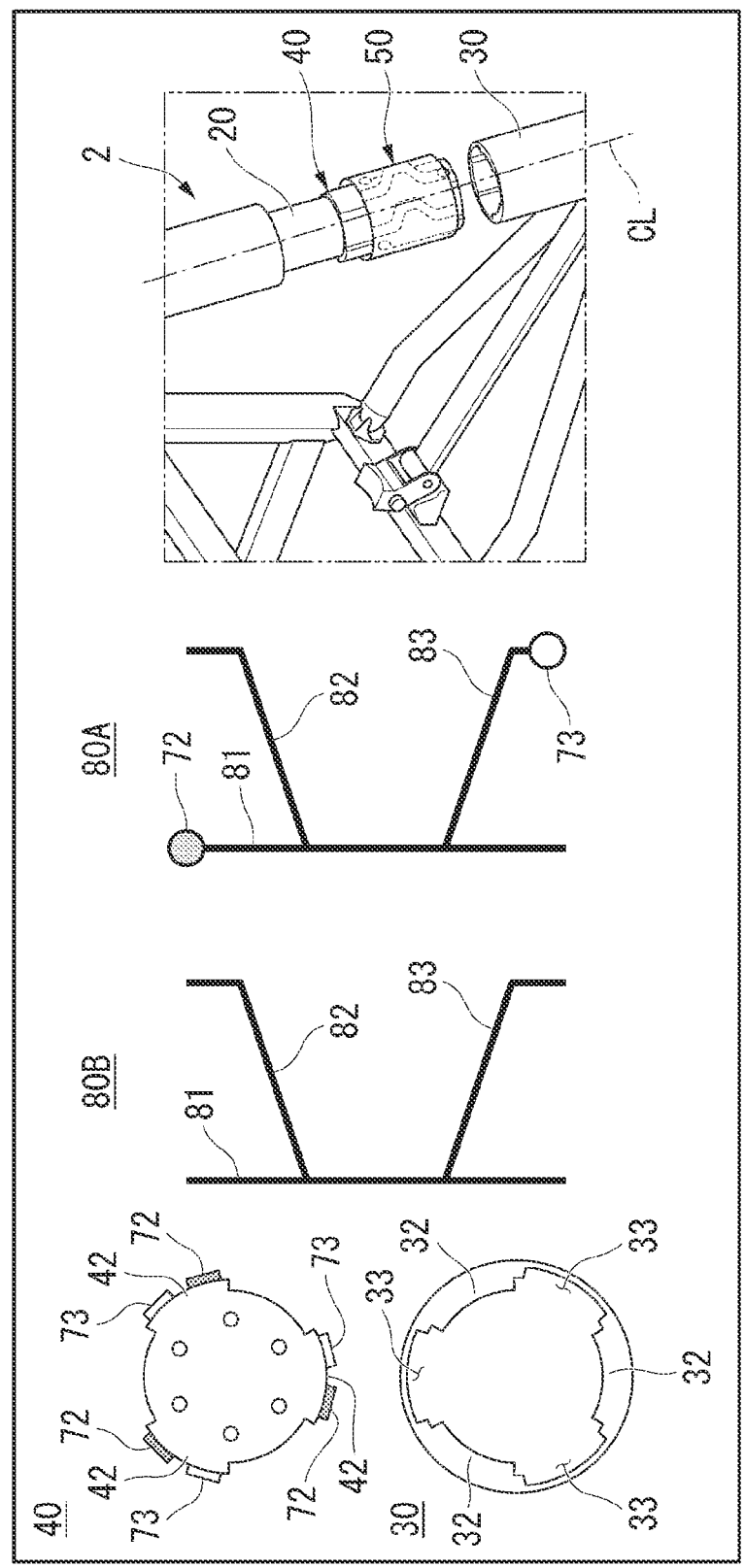
FIG. 12 is an explanatory view of operation of the rotation mechanism when an overstroke of the embodiment starts.
Figure 13:
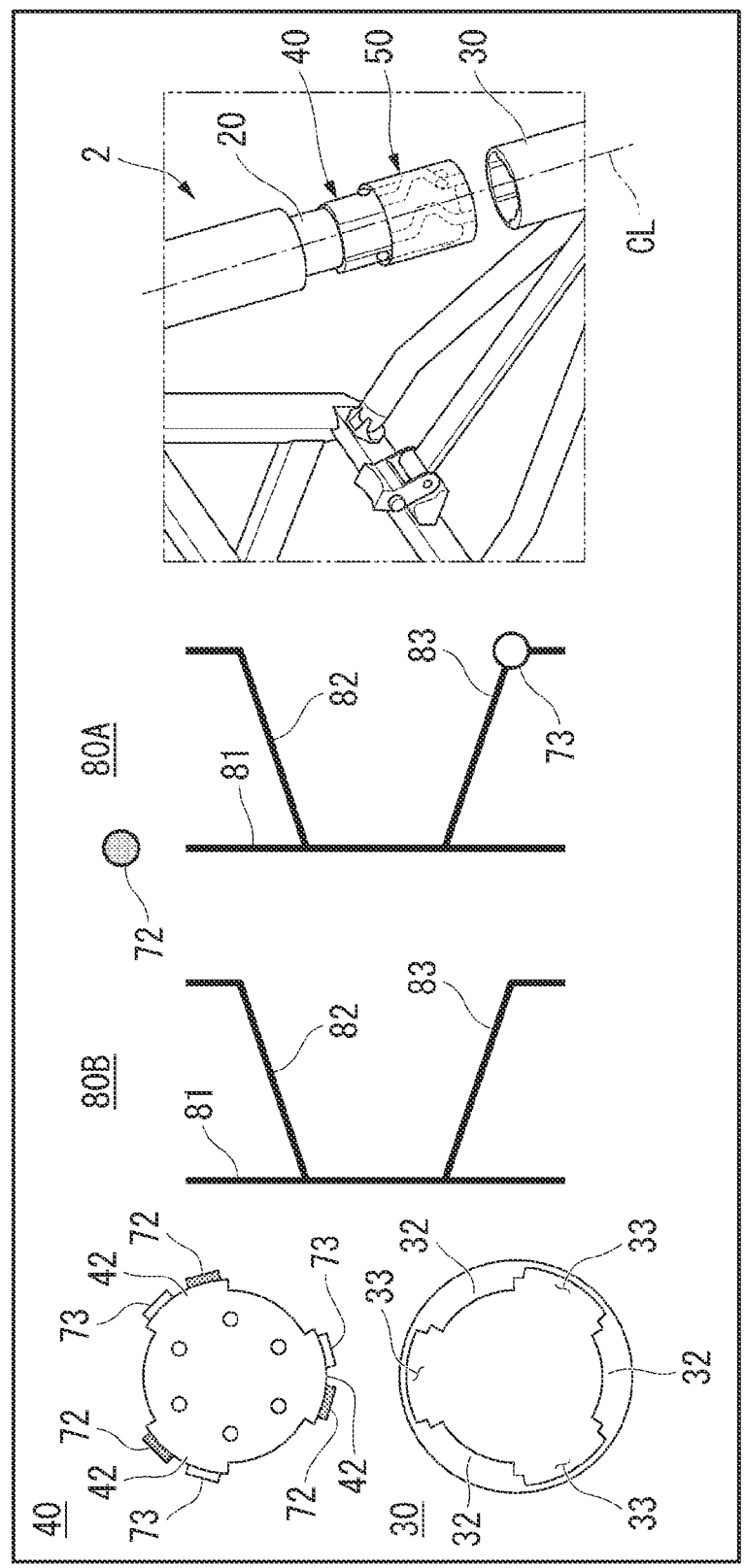
FIG. 13 is an explanatory view of operation immediately before a first rotation of the rotation mechanism of the embodiment.
Figure 14:
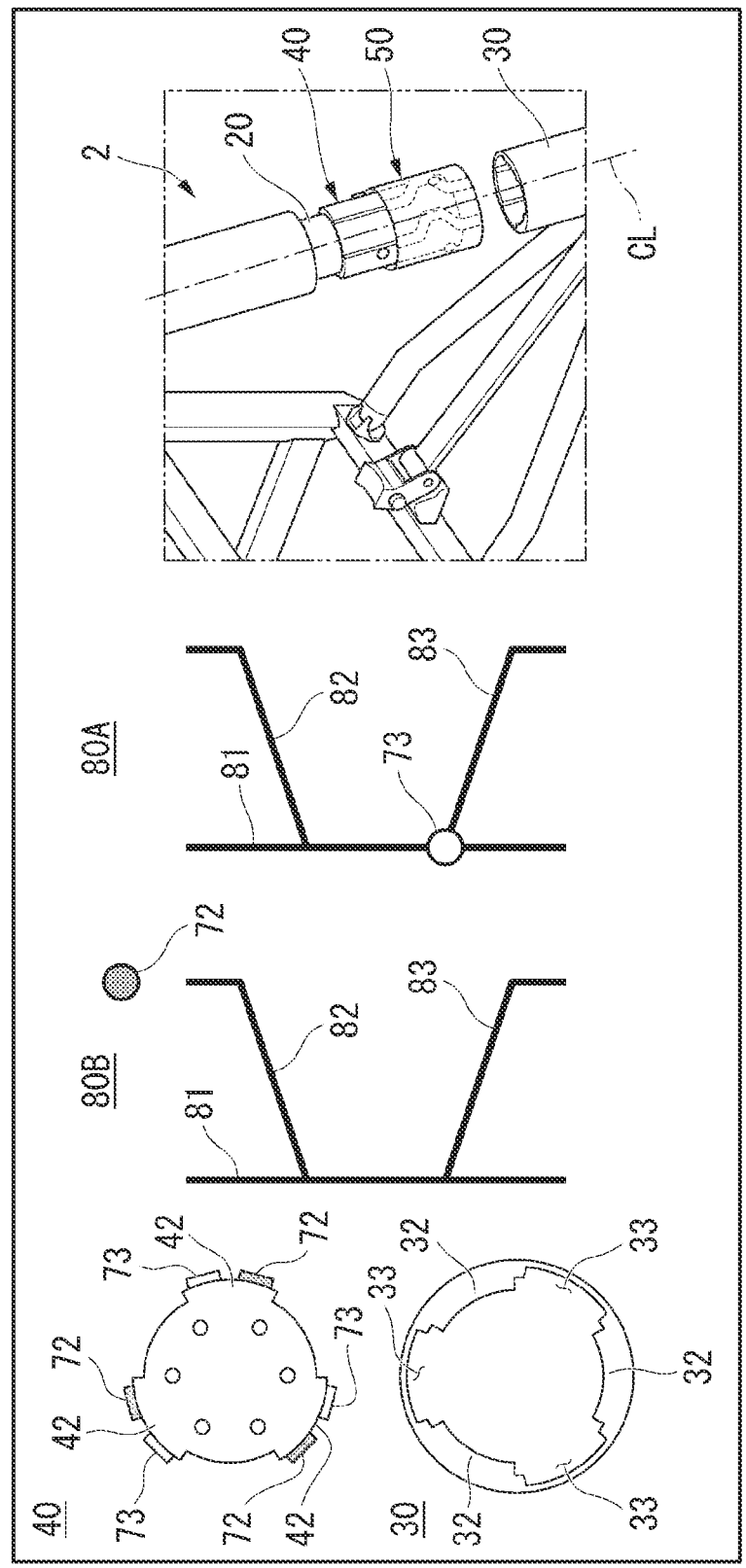
FIG. 14 is an explanatory view of operation immediately after the first rotation of the rotation mechanism of the embodiment.
Figure 15:
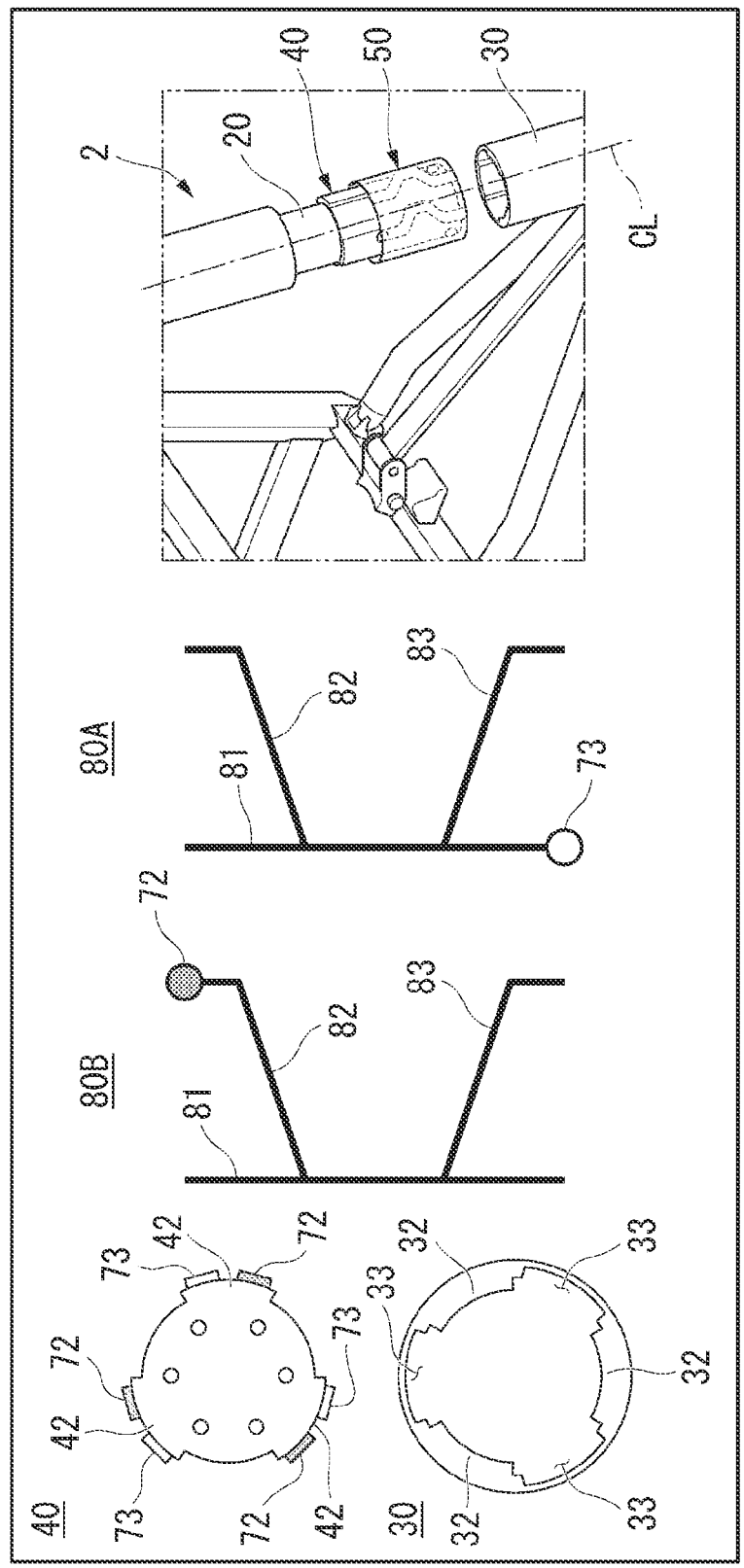
FIG. 15 is an explanatory view of operation when returning from an overstroke position of the embodiment.
Figure 16:
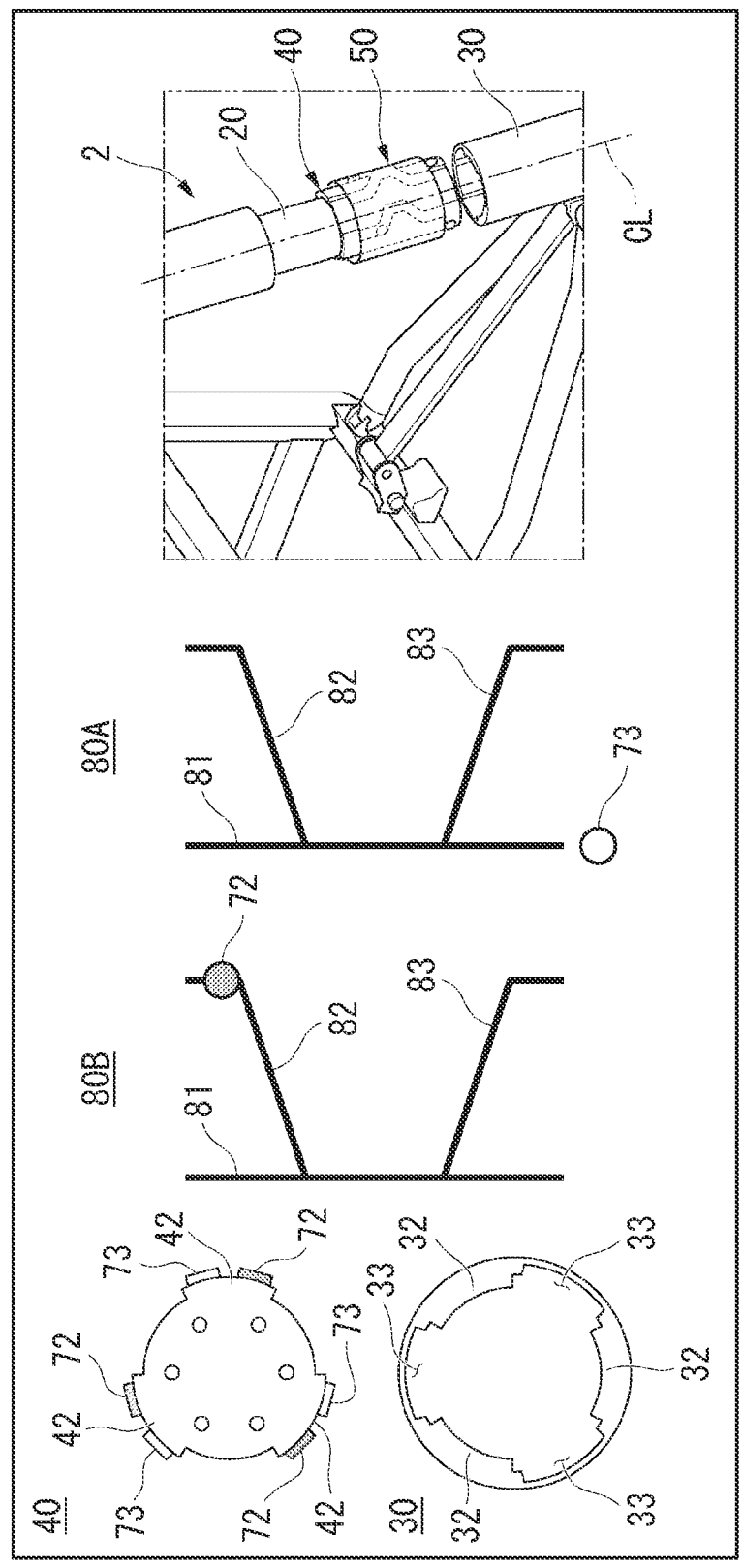
FIG. 16 is an explanatory view of operation immediately before a second rotation of the rotation mechanism of the embodiment.
Figure 17:
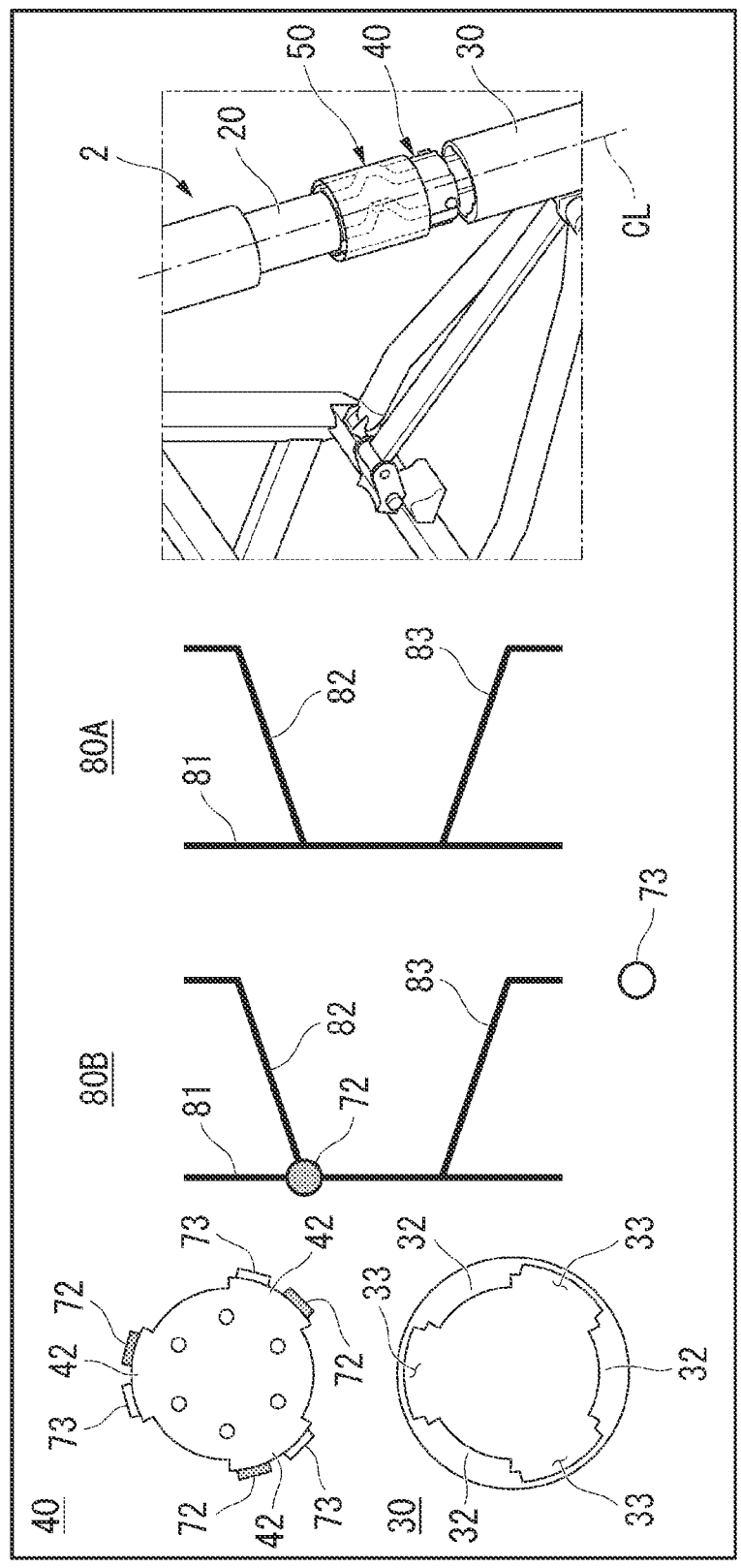
FIG. 17 is an explanatory view of operation immediately after the second rotation of the rotation mechanism of the embodiment.
Figure 18:
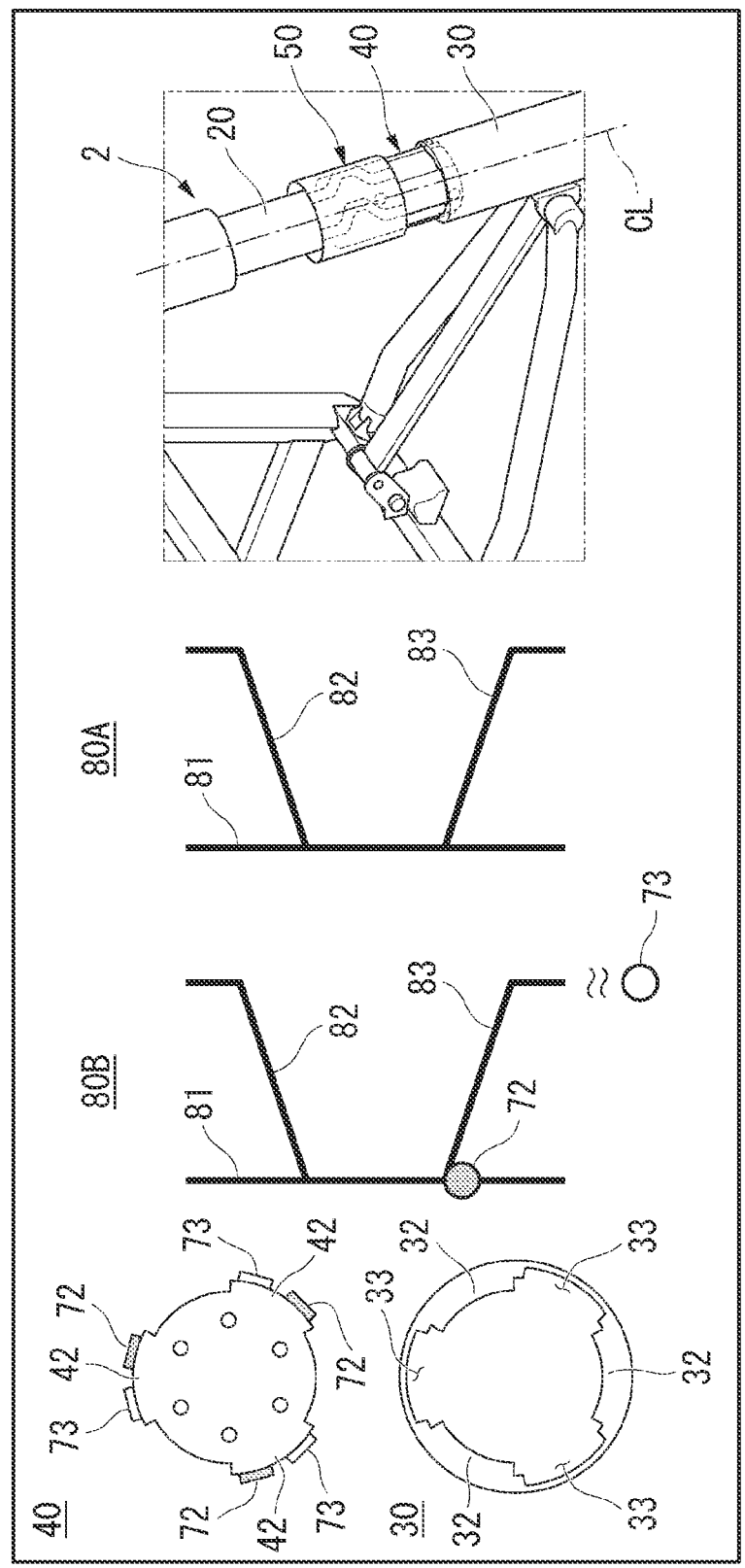
FIG. 18 is an explanatory view of operation when an upper cylinder of the embodiment is stowed in the lower cylinder.

FIG. 11 is an explanatory view of operation of the rotation mechanism 40 when the landing gear 2 of the embodiment is extended. FIG. 12 is an explanatory view of operation of the rotation mechanism 40 when an overstroke of the embodiment starts. FIG. 13 is an explanatory view of operation immediately before a first rotation of the rotation mechanism 40 of the embodiment. FIG. 14 is an explanatory view of operation immediately after the first rotation of the rotation mechanism 40 of the embodiment. FIG. 15 is an explanatory view of operation when returning from an overstroke position of the embodiment. FIG. 16 is an explanatory view of operation immediately before a second rotation of the rotation mechanism 40 of the embodiment. FIG. 17 is an explanatory view of operation immediately after the second rotation of the rotation mechanism 40 of the embodiment. FIG. 18 is an explanatory view of operation when the upper cylinder 20 of the embodiment is stowed in the lower cylinder 30.

In each diagram, the left side on this paper illustrates "a positional relationship of the abutting portions 42 of the rotation mechanism 40 with respect to the seat surface portions 32 of the lower cylinder 30", the central side on this paper illustrates "a positional relationship of the first projecting portion 72 and the second projecting portion 73 with respect to the groove structures 80", and the right side on this paper illustrates "a positional relationship of the rotation mechanism 40 with respect to the guide structure 50", respectively. Regarding the groove structures 80, two groove structures 80A and 80B adjacent to each other in the circumference direction in the guide structure 50 are illustrated.

As illustrated in FIG. 11, when the landing gear 2 is extended, the abutting portions 42 overlap the seat surface portions 32 when viewed in the axial direction. When the landing gear 2 is extended, the first projecting portion 72 is disposed at the center of the first groove 81 in the up-down direction in the groove structure 80A on one side. When the landing gear 2 is extended, the second projecting portion 73 is disposed below the third groove 83 in the groove structure 80A on one side. When the landing gear 2 is extended, a lower end of the rotation mechanism 40 is disposed below the guide structure 50. After operation in FIG. 11, operation shifts to that in FIG. 12.

As illustrated in FIG. 12, when an overstroke starts, the abutting portions 42 overlap the seat surface portions 32 when viewed in the axial direction. When an overstroke starts, the first projecting portion 72 is disposed at an upper end of the first groove 81 in the groove structure 80A on one side. When an overstroke starts, the second projecting portion 73 is disposed at a lower end of the third groove 83 in the groove structure 80A on one side. When an overstroke starts, an upper end of the rotation mechanism 40 is disposed above the guide structure 50. After operation in FIG. 12, operation shifts to that in FIG. 13.

As illustrated in FIG. 13, immediately before the first rotation of the rotation mechanism 40, the abutting portions 42 overlap the seat surface portions 32 when viewed in the axial direction. Immediately before the first rotation of the rotation mechanism 40, the first projecting portion 72 is disposed above the first groove 81 in the groove structure 80A on one side. Immediately before the first rotation of the rotation mechanism 40, the second projecting portion 73 is disposed in a bent portion of the third groove 83 in the groove structure 80A on one side. Immediately before the first rotation of the rotation mechanism 40, the lower end of the rotation mechanism 40 is disposed inside the guide structure 50. After operation in FIG. 13, operation shifts to that in FIG. 14.

As illustrated in FIG. 14, immediately after the first rotation of the rotation mechanism 40, the abutting portions 42 overlap a part of the seat surface portions 32 and a part of the sliding grooves 33 when viewed in the axial direction. Immediately after the first rotation of the rotation mechanism 40, the first projecting portion 72 is disposed above the second groove 82 in the groove structure 80B on the other side. Immediately after the first rotation of the rotation mechanism 40, the second projecting portion 73 is disposed in an intersecting portion between the first groove 81 and the third groove 83 in the groove structure 80A on one side. Immediately after the first rotation of the rotation mechanism 40, the rotation mechanism 40 completes rotation of 30° about the reference axis CL Immediately after the first rotation of the rotation mechanism 40, the first projecting portion 72 and the second projecting portion 73 move further upward from the positions in FIG. 14. Thereafter, the first projecting portion 72 and the second projecting portion 73 stop at the overstroke position (terminal position). After operation in FIG. 14, operation shifts to that in FIG. 15.

As illustrated in FIG. 15, when returning from the overstroke position, the abutting portions 42 overlap a part of the seat surface portions 32 and a part of the sliding grooves 33 when viewed in the axial direction. When returning from the overstroke position, the first projecting portion 72 is disposed at an upper end of the second groove 82 in the groove structure 80B on the other side. When returning from the overstroke position, the second projecting portion 73 is disposed at a lower end of the first groove 81 in the groove structure 80A on one side. When returning from the overstroke position, the lower end of the rotation mechanism 40 is disposed inside the guide structure 50. After operation in FIG. 15, operation shifts to that in FIG. 16.

As illustrated in FIG. 16, immediately before the second rotation of the rotation mechanism 40, the abutting portions 42 overlap a part of the seat surface portions 32 and a part of the sliding grooves 33 when viewed in the axial direction. Immediately before the second rotation of the rotation mechanism 40, the first projecting portion 72 is disposed in a bent portion of the second groove 82 in the groove structure 80B on the other side. Immediately before the second rotation of the rotation mechanism 40, the second projecting portion 73 is disposed below the first groove 81 in the groove structure 80A on one side. Immediately before the second rotation of the rotation mechanism 40, the lower end of the rotation mechanism 40 is disposed below the guide structure 50. After operation in FIG. 16, operation shifts to that in FIG. 17.

As illustrated in FIG. 17, immediately after the second rotation of the rotation mechanism 40, the abutting portions 42 do not overlap the seat surface portions 32 when viewed in the axial direction and overlap the sliding grooves 33. Immediately after the second rotation of the rotation mechanism 40, the first projecting portion 72 is disposed in an intersecting portion between the first groove 81 and the second groove 82 in the groove structure 80B on the other side. Immediately after the second rotation of the rotation mechanism 40, the second projecting portion 73 is disposed below the third groove 83 in the groove structure 80B on the other side. Immediately after the second rotation of the rotation mechanism 40, the rotation mechanism 40 completes rotation of 30° about the reference axis CL (rotation of 60° together with the first rotation). After operation in FIG. 17, operation shifts to that in FIG. 18.

As illustrated in FIG. 18, when the upper cylinder 20 is stowed in the lower cylinder 30, the abutting portions 42 overlap the sliding grooves 33 when viewed in the axial direction. When the upper cylinder 20 is stowed in the lower cylinder 30, the first projecting portion 72 is disposed in the lower portion of the first groove 81 in the groove structure 80B on the other side. When the upper cylinder 20 is stowed in the lower cylinder 30, the second projecting portion 73 is disposed below the third groove 83 in the groove structure 80B on the other side. When the upper cylinder 20 is stowed in the lower cylinder 30, the lower end of the rotation mechanism 40 is disposed inside the lower cylinder 30. After operation in FIG. 18, the lower end of the rotation mechanism is brought closer toward a lower end of the lower cylinder 30.

Through the foregoing operation, the landing gear 2 is folded and is in the stowed state. Operation of the landing gear 2 shifting from the stowed state to the released state becomes operation in which the foregoing order is reversed (operation in the order from FIGS. 18 to 11).

<One-Motion Operation of Transmission Arm and Cylinder Mechanism>

FIG. 19 is an explanatory view of one-motion operation of the transmission arm 92 and the cylinder mechanism 3 of the embodiment. In FIG. 19, the upper stage on this paper shows "change in angle of the transmission arm 92 turning around the first transmission axis D2 over time", the middle stage on this paper shows "change in stroke of the cylinder mechanism 3 over time", and the lower stage on this paper shows "change in angle of the cylinder mechanism 3 turning around the first axis C1 over time", respectively. In each stage, the horizontal axis indicates time of one-motion (the same time axis in each stage) as time.

As illustrated in FIG. 19, due to angle change of the transmission arm 92 in one-motion, the stroke of the cylinder mechanism 3 changes and the angle of the cylinder mechanism 3 changes. That is, in the cylinder mechanism 3, turning operation around the first axis C1 and extending operation in the axial direction are performed when a driving force is transmitted from the transmission arm 92 in one-motion. Due to such operation, the landing gear 2 can switch between the released state and the stowed state in one-motion.

<Operational Effects>

As described above, the landing gear 2 for the flight vehicle 1 of the foregoing embodiment is used during landing. The landing gear 2 for the flight vehicle 1 includes the first cylinder structure 3A configured to have the upper end which is coupled to be able to roll with respect to the flight vehicle 1; and the second cylinder structure 3B configured to have the lower end which is able to come into contact with the ground, configured to be able to relatively move in the axial direction along the reference axis CL with respect to the first cylinder structure 3A, and configured to be able to relatively rotate about the reference axis CL with respect to the first cylinder structure 3A. The first cylinder structure 3A and the second cylinder structure 3B switch the landing gear 2 between the stowed state and the released state by means of the relative movement and the relative rotation.

The landing gear 2 can switch between the stowed state and the released state by means of the relative movement and the relative rotation of the first cylinder structure 3A and the second cylinder structure 3B. For this reason, every time the flight vehicle 1 flies there is no need to produce and replace a landing gear 2. Therefore, a reusable landing gear 2 for the flight vehicle 1 can be provided.

In the foregoing embodiment, the first cylinder structure 3A includes the upper end having the upper cylinder 20 which is coupled to be able to roll with respect to the flight vehicle 1, and the rotation mechanism 40 provided in the upper cylinder 20 and able to rotate about the reference axis CL. The second cylinder structure 3B includes the lower cylinder 30 having the lower end which is able to come into contact with the ground and able to move in the axial direction with respect to the upper cylinder 20, and the guide structure 50 provided in the lower cylinder 30 and guiding rotation of the rotation mechanism 40 about the reference axis CL and movement in the axial direction.

According to this constitution, the landing gear 2 can switch between the stowed state and the released state by means of rotation of the rotation mechanism 40 about the reference axis CL and movement in the axial direction with respect to the guide structure 50.

In the foregoing embodiment, the rotation mechanism 40 alternately establishes the stowed state and the released state of the landing gear 2 by alternately repeating the rotation and the movement with respect to the guide structure 50 in accordance with movement of the lower cylinder 30 in the axial direction.

The stowed state and the released state of the landing gear 2 can be alternately established by the rotation mechanism 40 alternately repeating the rotation and the movement with respect to the guide structure 50.

In the foregoing embodiment, the lower cylinder 30 includes the lower cylinder body 31 having a cylindrical shape along the reference axis CL, and the seat surface portions 32 provided at the upper end of the lower cylinder body 31. The rotation mechanism 40 includes the rotation cylinder body 41 having a cylindrical shape along the reference axis CL, and the abutting portions 42 provided at the lower end of the rotation cylinder body 41 and abutting the seat surface portions 32 in the released state.

According to this constitution, the released state of the landing gear 2 can be maintained by the abutting portions 42 of the rotation mechanism 40 abutting the seat surface portions 32 of the lower cylinder 30 in the released state of the landing gear 2. For this reason, there is no need to provide a mechanism for maintaining the released state. Therefore, weight reduction, miniaturization, and cost control of the landing gear 2 can be achieved.

In the foregoing embodiment, the abutting portions 42 cancel abutment with respect to the seat surface portions 32 by means of rotation of the rotation mechanism 40.

According to this constitution, the landing gear 2 can be shifted from the released state to the stowed state by the abutting portions 42 of the rotation mechanism canceling abutment with respect to the seat surface portions 32 by means of rotation of the rotation mechanism 40. For this reason, there is no need to provide a mechanism for canceling abutment of the abutting portions 42 with respect to the seat surface portions 32. Therefore, weight reduction, miniaturization, and cost control of the landing gear 2 can be achieved.

In the foregoing embodiment, regarding the seat surface portions 32, a plurality of seat surface portions protrude from the inner circumference of the upper end of the lower cylinder body 31 to the inward side of the lower cylinder body 31 in the radial direction and are provided with a gap therebetween in the circumference direction of the lower cylinder body 31. Regarding the abutting portions 42, a plurality of abutting portions protrude from the outer circumference of the lower end of the rotation cylinder body 41 to the outward side of the rotation cylinder body 41 in the radial direction and are provided with a gap therebetween in the circumference direction of the rotation cylinder body 41.

According to this constitution, the released state of the landing gear 2 can be stably maintained by the plurality of abutting portions 42 respectively abutting the plurality of seat surface portions 32. On the other hand, the landing gear 2 can be shifted from the released state to the stowed state by canceling abutment of each of the abutting portions 42 with respect to each of the seat surface portions 32. In a case of shifting to the stowed state, each of the abutting portions 42 of the rotation cylinder body 41 passes through the interval (gap) between the seat surface portions 32 of the lower cylinder body 31 in the circumference direction. Therefore, extension of the landing gear 2 to the outward side of the lower cylinder body 31 in the radial direction can be curbed.

In the foregoing embodiment, regarding the seat surface portions 32, three seat surface portions are provided and have a rotationally symmetrical shape of three-fold symmetry with respect to the center of the lower cylinder body 31 when viewed in the axial direction. Regarding the abutting portions 42, three abutting portions are provided and have a rotationally symmetrical shape of three-fold symmetry with respect to the center of the rotation cylinder body 41 when viewed in the axial direction.

Incidentally, when two seat surface portions 32 and two abutting portions 42 are provided (when they are disposed with an interval therebetween with a central angle of 180° when viewed in the axial direction), the distance for the rotation mechanism 40 to be rotated becomes longer, and there is a need to increase an overstroke by an amount corresponding thereto. On the other hand, when four or more seat surface portions 32 and four or more abutting portions 42 are provided, areas for each of the seat surface portions 32 and each of the abutting portions 42 become smaller, and there is a probability that the tolerance with respect to a load and a shock at the time of landing will decrease.

In contrast, according to the present constitution, increase in overstroke can be curbed and decrease in tolerance with respect to a load and a shock at the time of landing can be curbed by providing three seat surface portions 32 and three abutting portions 42 in three-fold symmetry.

In the foregoing embodiment, the lower cylinder body 31 includes the sliding grooves 33 allowing the abutting portions 42 to slide therein. The sliding grooves 33 extend parallel to the axial direction from the upper end to the lower end of the lower cylinder body 31 in the inner circumference of the lower cylinder body 31.

According to this constitution, when the landing gear 2 is stowed or released, the abutting portions 42 at the lower end of the rotation cylinder body 41 can be moved parallel to the axial direction along the sliding grooves 33 in the inner circumference of the lower cylinder body 31. Therefore, the rotation mechanism 40 can be stably moved with respect to the lower cylinder 30. Furthermore, when the rotation mechanism 40 is attached to the tip of the rod 62 of the shock absorber 60, swing of the rotation mechanism 40 can be curbed. Therefore, deterioration of the shock absorber 60 can be curbed.

In the foregoing embodiment, the guide structure 50 includes the guide cylinder body 51 provided on the upper end side of the upper cylinder 20 from the seat surface portions 32 in the axial direction and having a cylindrical shape along the reference axis CL, and the plurality of groove structures 80 regularly provided in the circumference direction in the inner circumference of the guide cylinder body 51. The rotation mechanism 40 includes the rotation cylinder body 41 having a cylindrical shape along the reference axis CL, and the plurality of projection structures 70 regularly provided in the circumference direction in the outer circumference of the rotation cylinder body 41.

According to this constitution, the rotation mechanism 40 can alternately repeat rotation and movement with respect to the guide structure 50 by means of cooperation between the regularly provided groove structures 80 of the guide structure 50 and the regularly provided projection structures 70 of the rotation mechanism 40. For this reason, there is no need to provide a mechanism for applying motive power for operating the rotation mechanism 40. Therefore, weight reduction, miniaturization, and cost control of the landing gear 2 can be achieved.

In the foregoing embodiment, the groove structures 80 each includes the first groove 81 extending parallel to the axial direction from the upper end to the lower end of the guide cylinder body 51; the second groove 82 extending obliquely with respect to the axial direction from a middle part of the first groove 81 toward the upper end of the guide cylinder body 51 and opening at the upper end of the guide cylinder body 51; and the third groove 83 provided on the lower end side of the guide cylinder body 51 from the second groove 82, extending obliquely with respect to the axial direction from a middle part of the first groove 81 toward the lower end of the guide cylinder body 51, and opening at the lower end of the guide cylinder body 51. The projection structure 70 includes the extending portions 71 extending parallel to the axial direction from the upper end to the lower end of the rotation cylinder body 41; and the first projecting portions 72 and the second projecting portions 73 protruding from the extending portions 71 to the outward side of the rotation cylinder body 41 in the radial direction and provided with a gap therebetween in the circumference direction and the axial direction of the rotation cylinder body 41 in a manner of being able to slide in any of the first groove 81, the second groove 82, and the third groove 83.

According to this constitution, the rotation mechanism 40 can alternately repeat rotation and movement with respect to the guide structure 50 by means of cooperation between the first groove 81, the second groove 82, and the third groove 83 of the groove structures 80 and the first projecting portions 72 and the second projecting portions 73 of the projection structure 70. For this reason, there is no need to provide a mechanism for applying motive power for operating the rotation mechanism 40. Therefore, weight reduction, miniaturization, and cost control of the landing gear 2 can be achieved. Furthermore, the lower cylinder 30 can be smoothly moved in the axial direction and the landing gear 2 can be smoothly stowed and released by obliquely providing the second groove 82 and the third groove 83 with respect to the first groove 81.

In the foregoing embodiment, the shock absorber 60 is stowed inside the upper cylinder 20. The shock absorber 60 includes the rod 62 extending in the axial direction and able to rotate about the reference axis CL. The rotation mechanism 40 is attached to the tip of the rod 62.

According to this constitution, a shock at the time of landing transmitted to the lower end of the rotation mechanism 40 from the upper end of the lower cylinder 30 can be absorbed by the shock absorber 60. Furthermore, since the rod 62 of the shock absorber 60 can rotate about the reference axis CL and the rotation mechanism 40 is attached to the tip of the rod 62, there is no need to provide a mechanism for rotating the rotation mechanism 40. Therefore, weight reduction, miniaturization, and cost control of the landing gear 2 can be achieved.

In the foregoing embodiment, the landing gear 2 for the flight vehicle 1 includes the lower beams 90 configured to each have the first end which is coupled to be able to roll with respect to the flight vehicle 1 and have the second end which is coupled to be able to roll with respect to the lower cylinder 30.

According to this constitution, when the stowed state and the released state of the landing gear 2 are alternately established, the lower cylinder 30 can be stably supported by the lower beams 90. For example, when the flight vehicle 1 flies, the landing gear 2 can be stowed compactly by bringing the lower beams 90 closer to the flight vehicle 1 and moving the lower cylinder 30 to the upper end side of the upper cylinder 20. For example, when the flight vehicle 1 is landing, the flight vehicle 1 can be made stable by disposing the lower end of the lower cylinder 30 away from the flight vehicle 1.

In the foregoing embodiment, regarding the lower beams 90, a pair of lower beams are provided such that the first ends are coupled to two spots in the flight vehicle 1. The actuator 91 for driving the landing gear 2 and the transmission arm 92 for transmitting a driving force of the actuator 91 to the lower cylinder 30 are provided between the pair of lower beams 90.

According to this constitution, a load when the lower end of the lower cylinder comes into contact with the ground in the released state of the landing gear 2 can be received by the transmission arm 92. Therefore, burdens applied to other spots at the time of landing can be reduced. For example, a structure for protecting the actuator 91 can be realized by the transmission arm 92 absorbing a landing load.

Incidentally, when the actuator 91 is attached to each of the pair of lower beams 90, there is a need for the actuator 91 to play a role of absorbing a shock at the time of landing so that there is a probability that the size of the actuator 91 will increase. In contrast, according to the present aspect, the actuator 91 need only have a driving force for driving the landing gear 2 by providing the actuator 91 between the pair of lower beams 90 (specifically, connected to the lower beams 90 with the transmission arm 92 therebetween). Therefore, the actuator 91 can be miniaturized, and costs can also be controlled.

In the foregoing embodiment, the actuator 91 is surrounded by the flight vehicle 1, the lower cylinder 30, and the pair of lower beams 90 in the stowed state.

According to this constitution, the actuator 91 in the stowed state can be protected from an external factor by the flight vehicle 1, the lower cylinder 30, and the pair of lower beams 90. For example, wear of the actuator 91 can be prevented by the landing gear 2 covering the actuator 91 while the flight vehicle 1 is flying when the landing gear 2 is folded.

Incidentally, if components, such as the actuator 91, project considerably to the outward side of the flight vehicle 1 in the radial direction while the landing gear 2 is in the stowed state, there is a probability that aerodynamic performance of the flight vehicle 1 will decrease. In contrast, according to the present aspect, since the actuator 91 is surrounded by the flight vehicle 1, the lower cylinder 30, and the pair of lower beams 90 while the landing gear 2 is in the stowed state, components projecting to the outward side of the flight vehicle 1 in the radial direction can be made compact as much as possible. Therefore, decrease in aerodynamic performance of the flight vehicle 1 can be minimized.

In the foregoing embodiment, when the landing gear 2 is shifted from the released state to the stowed state, operation is performed in a direction in which the lower beams 90 are separated from the flight vehicle 1.

According to this constitution, the direction in which the lower beams 90 are separated from the flight vehicle 1 is a direction in which the lower end of the rotation mechanism 40 is separated from the upper end of the lower cylinder 30. For this reason, the rotation mechanism 40 can be operated in a state in which no extra force is applied to the lower end of the rotation mechanism 40. Therefore, the rotation mechanism 40 can be smoothly operated.

Modification Example

In the foregoing embodiment, an example in which the first cylinder structure includes an upper cylinder having an upper end which is coupled to be able to roll with respect to the flight vehicle, and a rotation mechanism provided in the upper cylinder and able to rotate about the reference axis; and the second cylinder structure includes a lower cylinder having a lower end which is able to come into contact with the ground and able to move in the axial direction with respect to the upper cylinder, and a guide structure provided in the lower cylinder and guiding rotation of the rotation mechanism about the reference axis and movement in the axial direction has been described, but the embodiment is not limited thereto. For example, the first cylinder structure may not include an upper cylinder and a rotation mechanism. For example, the first cylinder structure may include a lower cylinder and a guide structure. For example, the second cylinder structure may not include a lower cylinder and a guide structure. For example, the second cylinder structure may include an upper cylinder and a rotation mechanism. For example, the first cylinder structure may include one of an upper cylinder and a lower cylinder and one of a rotation mechanism and a guide structure, and the second cylinder structure may include the other of the upper cylinder and the lower cylinder and the other of the rotation mechanism and the guide structure. For example, the constitution forms of the first cylinder structure and the second cylinder structure can be changed in accordance with a requirement specification.

In the foregoing embodiment, an example in which the rotation mechanism alternately establishes the stowed state and the released state of the landing gear by alternately repeating the rotation and the movement with respect to the guide structure in accordance with movement of the lower cylinder in the axial direction has been described, but the embodiment is not limited thereto. For example, the rotation mechanism may not alternately repeat the rotation and the movement with respect to the guide structure in accordance with movement of the lower cylinder in the axial direction. For example, the landing gear may switch between the stowed state and the released state by means of rotation of the rotation mechanism about the reference axis and movement in the axial direction with respect to the guide structure. For example, the landing gear may switch between the stowed state and the released state by means of relative movement and relative rotation of the first cylinder structure and the second cylinder structure. For example, the forms of relative movement and relative rotation can be changed in accordance with a requirement specification.

In the foregoing embodiment, an example in which the lower cylinder includes a lower cylinder body having a cylindrical shape along the reference axis, and seat surface portions provided at an upper end of the lower cylinder body; and the rotation mechanism includes a rotation cylinder body having a cylindrical shape along the reference axis, and abutting portions provided at a lower end of the rotation cylinder body and abutting the seat surface portions in the released state has been described, but the embodiment is not limited thereto. For example, the lower cylinder may not include seat surface portions. For example, the rotation mechanism may not include abutting portions. For example, a mechanism for maintaining the released state of the landing gear may be provided. For example, the constitution form for maintaining the released state of the landing gear can be changed in accordance with a requirement specification.

In the foregoing embodiment, an example in which the abutting portions cancel abutment with respect to the seat surface portions by means of the rotation of the rotation mechanism has been described, but the embodiment is not limited thereto. For example, the abutting portions may not cancel abutment with respect to the seat surface portions by means of the rotation of the rotation mechanism. For example, a mechanism for canceling abutment with respect to the seat surface portions of the abutting portions may be provided. For example, the constitution form for canceling abutment with respect to the seat surface portions of the abutting portions can be changed in accordance with a requirement specification.

In the foregoing embodiment, an example in which regarding the seat surface portions, a plurality of seat surface portions protrude from an inner circumference of the upper end of the lower cylinder body to an inward side of the lower cylinder body in a radial direction and are provided with a gap therebetween in a circumference direction of the lower cylinder body; and regarding the abutting portions, a plurality of abutting portions protrude from an outer circumference of the lower end of the rotation cylinder body to an outward side of the rotation cylinder body in the radial direction and are provided with a gap therebetween in the circumference direction of the rotation cylinder body has been described, but the embodiment is not limited thereto. For example, the seat surface portions may not protrude from the inner circumference of the upper end of the lower cylinder body to the inward side of the lower cylinder body in the radial direction. For example, regarding the seat surface portions, a plurality of seat surface portions may not be provided with a gap therebetween in the circumference direction of the rotation cylinder body. For example, the abutting portions may not protrude from the outer circumference of the lower end of the rotation cylinder body to the outward side of the rotation cylinder body in the radial direction. For example, regarding the abutting portions, a plurality of abutting portions may not be provided with a gap therebetween in the circumference direction of the rotation cylinder body. For example, the installation forms of the seat surface portions and the abutting portions can be changed in accordance with a requirement specification.

In the foregoing embodiment, an example in which regarding the seat surface portions, three seat surface portions are provided and have a rotationally symmetrical shape of three-fold symmetry with respect to a center of the lower cylinder body when viewed in the axial direction; and regarding the abutting portions, three abutting portions are provided and have a rotationally symmetrical shape of three-fold symmetry with respect to a center of the rotation cylinder body when viewed in the axial direction has been described, but the embodiment is not limited thereto. For example, two seat surface portions and two abutting portions may be provided. For example, four or more seat surface portions and four or more abutting portions may be provided. For example, the numbers of seat surface portions and abutting portions to be installed can be changed in accordance with a requirement specification.

In the foregoing embodiment, an example in which the lower cylinder body includes sliding grooves allowing the abutting portions to slide therein, and the sliding grooves extend parallel to the axial direction from the upper end to the lower end of the lower cylinder body in the inner circumference of the lower cylinder body has been described, but the embodiment is not limited thereto. For example, the sliding grooves may not extend parallel to the axial direction from the upper end to the lower end of the lower cylinder body in the inner circumference of the lower cylinder body. For example, the sliding grooves may extend parallel to the axial direction from the upper end toward the lower end of the lower cylinder body to a part in the middle in the inner circumference of the lower cylinder body. For example, the lower cylinder body may not include sliding grooves. For example, the installation form of the sliding grooves can be changed in accordance with a requirement specification.

In the foregoing embodiment, an example in which the guide structure includes a guide cylinder body provided on the upper end side of the upper cylinder from the seat surface portions in the axial direction and having a cylindrical shape along the reference axis, and a plurality of groove structures regularly provided in the circumference direction in an inner circumference of the guide cylinder body; and the rotation mechanism includes a rotation cylinder body having a cylindrical shape along the reference axis, and a plurality of projection structures regularly provided in the circumference direction in an outer circumference of the rotation cylinder body has been described, but the embodiment is not limited thereto. For example, the guide structure may not include groove structures which are regularly provided. For example, the rotation mechanism may not include projection structures which are regularly provided. For example, a mechanism for applying motive power for operating the rotation mechanism may be provided. For example, the constitution forms of the guide structure and the rotation mechanism can be changed in accordance with a requirement specification.

In the foregoing embodiment, an example in which projecting portions of the rotation mechanism provided in the upper cylinder are guided along grooves of the guide structure provided in the lower cylinder has been described, but the embodiment is not limited thereto. For example, the rotation mechanism provided in the upper cylinder may have grooves in the rotation cylinder body, and the guide structure provided in the lower cylinder may have projecting portions (for example, projecting portions which do not rotate about the reference axis). For example, a constitution in which projecting portions of the guide structure provided in the lower cylinder are guided along grooves of the rotation mechanism provided in the upper cylinder. For example, the constitution forms of the projecting portions and the grooves in the rotation mechanism and the guide structure can be changed in accordance with a requirement specification.

In the foregoing embodiment, an example in which the groove structures each include a first groove extending parallel to the axial direction from the upper end to the lower end of the guide cylinder body, a second groove extending obliquely with respect to the axial direction from a middle part of the first groove toward the upper end of the guide cylinder body and opening at the upper end of the guide cylinder body, and a third groove provided on the lower end side of the guide cylinder body from the second groove, extending obliquely with respect to the axial direction from a middle part of the first groove toward the lower end of the guide cylinder body, and opening at the lower end of the guide cylinder body; and the projection structure includes extending portions extending parallel to the axial direction from the upper end to the lower end of the rotation cylinder body, and first projecting portions and second projecting portions protruding from the extending portions to the outward side of the rotation cylinder body in the radial direction and provided with a gap therebetween in the circumference direction and the axial direction of the rotation cylinder body in a manner of being able to slide in any of the first groove, the second groove, and the third groove has been described, but the embodiment is not limited thereto. For example, the groove structures may not include a first groove, a second groove, and a third groove. For example, the projection structure may not include first projecting portions and second projecting portions. For example, the projection structure may not include extending portions. For example, a mechanism for applying motive power for operating the rotation mechanism may be provided. For example, the constitution forms of the groove structures and the projection structure can be changed in accordance with a requirement specification.

In the foregoing embodiment, an example in which a shock absorber is stowed inside the upper cylinder, and the shock absorber includes a rod extending in the axial direction and able to rotate about the reference axis; and the rotation mechanism is attached to a tip of the rod has been described, but the embodiment is not limited thereto. For example, the shock absorber may not be stowed inside the upper cylinder. For example, the shock absorber may be provided outside the upper cylinder. For example, the rotation mechanism may not be attached to the tip of the rod. For example, a mechanism for rotating the rotation mechanism may be provided. For example, the installation forms of the shock absorber and the rotation mechanism can be changed in accordance with a requirement specification.

In the foregoing embodiment, an example in which the upper cylinder is disposed closer to the flight vehicle than the lower cylinder in the axial direction along the reference axis in the released state of the landing gear has been described, but the embodiment is not limited thereto. For example, the lower cylinder may be disposed closer to the flight vehicle than the upper cylinder in the axial direction along the reference axis in the released state of the landing gear. For example, the positions of the upper cylinder and the lower cylinder may be reversed in the axial direction along the reference axis. For example, the shock absorber may be attached to the lower cylinder. For example, the shock absorber may be attached to the transmission arm. For example, the positions of the upper cylinder and the lower cylinder in the axial direction along the reference axis and the installation form of the shock absorber can be changed in accordance with a requirement specification.

In the foregoing embodiment, an example in which the landing gear includes lower beams configured to each have a first end which is coupled to be able to roll with respect to the flight vehicle and have a second end which is coupled to be able to roll with respect to the lower cylinder has been described, but the embodiment is not limited thereto. For example, the landing gear may not include lower beams. For example, the installation form of the lower beams can be changed in accordance with a requirement specification.

In the foregoing embodiment, an example in which regarding the lower beams, a pair of lower beams are provided such that the first ends are coupled to two spots in the flight vehicle, and an actuator for driving the landing gear and a transmission arm for transmitting a driving force of the actuator to the lower cylinder is provided between the pair of lower beams has been described, but the embodiment is not limited thereto. For example, a pair of lower beams may not be provided. For example, only one lower beam may be provided. For example, three or more lower beams may be provided. For example, the actuator and the transmission arm may not be provided between the pair of lower beams. For example, the installation forms of the actuator and the transmission arm can be changed in accordance with a requirement specification.

In the foregoing embodiment, an example in which the actuator is surrounded by the flight vehicle, the lower cylinder, and the pair of lower beams in the stowed state has been described, but the embodiment is not limited thereto. For example, the actuator may not be surrounded by the flight vehicle, the lower cylinder, and the pair of lower beams in the stowed state. For example, the disposition form of the actuator in the stowed state can be changed in accordance with a requirement specification.

In the foregoing embodiment, an example in which when the landing gear is shifted from the released state to the stowed state, operation is performed in a direction in which the lower beams are separated from the flight vehicle has been described, but the embodiment is not limited thereto. For example, when the landing gear is shifted from the released state to the stowed state, operation may not be performed in a direction in which the lower beams are separated from the flight vehicle. For example, when the landing gear is shifted from the released state to the stowed state, operation may be performed in a direction opposite to the direction in which the lower beams are separated from the flight vehicle. For example, the operation form of shifting the landing gear from the released state to the stowed state can be changed in accordance with a requirement specification.

Hereinabove, a preferable embodiment of the present invention has been described, but the present invention is not limited thereto. Addition, omission, replacement, and other changes of the constitutions can be made within a range not departing from the gist of the present invention, and the modification examples described above can be suitably combined.

What is claimed is:

1. A landing gear for a flight vehicle used during landing, the landing gear for a flight vehicle comprising:
    a first cylinder structure configured to have an upper end which is coupled to be able to pivot with respect to the flight vehicle; and
    a second cylinder structure configured to have a lower end which is able to come into contact with the ground, configured to be able to relatively move in an axial direction along a reference axis with respect to the first cylinder structure, and configured to be able to relatively rotate about the reference axis with respect to the first cylinder structure,
    wherein the first cylinder structure and the second cylinder structure switch the landing gear between a stowed state and a released state by means of the relative movement and the relative rotation,
    wherein the first cylinder structure includes
    an upper cylinder having an upper end which is coupled to be able to pivot with respect to the flight vehicle, and
    a rotation mechanism provided in the upper cylinder and able to rotate about the reference axis, and
    wherein the second cylinder structure includes
    a lower cylinder having a lower end which is able to come into contact with the ground and able to move in the axial direction with respect to the upper cylinder, and
    a guide structure provided in the lower cylinder and guiding rotation of the rotation mechanism about the reference axis and movement in the axial direction.

2. The landing gear for a flight vehicle according to claim 1, wherein the rotation mechanism alternately establishes the stowed state and the released state of the landing gear by alternately repeating the rotation and the movement with respect to the guide structure in accordance with movement of the lower cylinder in the axial direction.

3. The landing gear for a flight vehicle according to claim 1,
wherein a shock absorber is stowed inside the upper cylinder,
wherein the shock absorber includes a rod extending in the axial direction and able to rotate about the reference axis, and
wherein the rotation mechanism is attached to a tip of the rod.

4. The landing gear for a flight vehicle according to claim 1,
wherein the lower cylinder includes
a lower cylinder body having a cylindrical shape along the reference axis, and
seat surface portions provided at an upper end of the lower cylinder body,
wherein the guide structure includes
a guide cylinder body provided on the upper end side of the upper cylinder from the seat surface portions in the axial direction and having a cylindrical shape along the reference axis, and
a plurality of groove structures regularly provided in the circumference direction in an inner circumference of the guide cylinder body, and
wherein the rotation mechanism includes
a rotation cylinder body having a cylindrical shape along the reference axis, and
a plurality of projection structures regularly provided in the circumference direction in an outer circumference of the rotation cylinder body.

5. The landing gear for a flight vehicle according to claim 4,
wherein the groove structures each include
a first groove extending parallel to the axial direction from the upper end to the lower end of the guide cylinder body;
a second groove extending obliquely with respect to the axial direction from a middle part of the first groove toward the upper end of the guide cylinder body and opening at the upper end of the guide cylinder body; and
a third groove provided on the lower end side of the guide cylinder body from the second groove, extending obliquely with respect to the axial direction from a middle part of the first groove toward the lower end of the guide cylinder body, and opening at the lower end of the guide cylinder body, and
wherein the projection structure includes
extending portions extending parallel to the axial direction from the upper end to the lower end of the rotation cylinder body; and
first projecting portions and second projecting portions protruding from the extending portions to the outward side of the rotation cylinder body in the radial direction and provided with a gap therebetween in the circumference direction and the axial direction of the rotation cylinder body in a manner of being able to slide in any of the first groove, the second groove, and the third groove.

6. The landing gear for a flight vehicle according to claim 1 further comprising:
lower beams configured to each have a first end which is coupled to be able to pivot with respect to the flight vehicle and have a second end which is coupled to be able to pivot with respect to the lower cylinder.

7. The landing gear for a flight vehicle according to claim 6,
wherein when the landing gear is shifted from the released state to the stowed state, operation is performed in a direction in which the lower beams are separated from the flight vehicle.

8. The landing gear for a flight vehicle according to claim 6,
wherein regarding the lower beams, a pair of lower beams are provided such that the first ends are coupled to two spots in the flight vehicle, and
wherein an actuator for driving the landing gear and a transmission arm for transmitting a driving force of the actuator to the lower cylinder are provided between the pair of lower beams.

9. The landing gear for a flight vehicle according to claim 8,
wherein the actuator is surrounded by the flight vehicle, the lower cylinder, and the pair of lower beams in the stowed state.

10. The landing gear for a flight vehicle according to claim 1,
wherein the lower cylinder includes
a lower cylinder body having a cylindrical shape along the reference axis, and
seat surface portions provided at an upper end of the lower cylinder body, and
wherein the rotation mechanism includes
a rotation cylinder body having a cylindrical shape along the reference axis, and
abutting portions provided at a lower end of the rotation cylinder body and abutting the seat surface portions in the released state.

11. The landing gear for a flight vehicle according to claim 10,
wherein the abutting portions cancel abutment with respect to the seat surface portions by means of the rotation of the rotation mechanism.

12. The landing gear for a flight vehicle according to claim 10,
wherein the lower cylinder body includes sliding grooves allowing the abutting portions to slide therein, and
wherein the sliding grooves extend parallel to the axial direction from the upper end to the lower end of the lower cylinder body in the inner circumference of the lower cylinder body.

13. The landing gear for a flight vehicle according to claim 10,
wherein regarding the seat surface portions, a plurality of seat surface portions protrude from an inner circumference of the upper end of the lower cylinder body to an inward side of the lower cylinder body in a radial direction and are provided with a gap therebetween in a circumference direction of the lower cylinder body, and
wherein regarding the abutting portions, a plurality of abutting portions protrude from an outer circumference of the lower end of the rotation cylinder body to an outward side of the rotation cylinder body in the radial direction and are provided with a gap therebetween in the circumference direction of the rotation cylinder body.

14. The landing gear for a flight vehicle according to claim 13,
- wherein regarding the seat surface portions, three seat surface portions are provided and have a rotationally symmetrical shape of three-fold symmetry with respect to a center of the lower cylinder body when viewed in the axial direction, and
- wherein regarding the abutting portions, three abutting portions are provided and have a rotationally symmetrical shape of three-fold symmetry with respect to a center of the rotation cylinder body when viewed in the axial direction.

* * * * *